(12) United States Patent
Inada

(10) Patent No.: US 7,372,461 B2
(45) Date of Patent: May 13, 2008

(54) IMAGE PROCESSING APPARATUS AND METHOD OF SAME

(75) Inventor: Tetsugo Inada, Tokyo (JP)

(73) Assignee: Sony Corporation, Tokyo (JP)

( * ) Notice: Subject to any disclaimer, the term of this patent is extended or adjusted under 35 U.S.C. 154(b) by 431 days.

(21) Appl. No.: 10/419,390

(22) Filed: Apr. 21, 2003

(65) Prior Publication Data
US 2003/0231180 A1 Dec. 18, 2003

(30) Foreign Application Priority Data
Apr. 22, 2002 (JP) .............................. 2002-119009

(51) Int. Cl.
*G06T 15/00* (2006.01)
(52) U.S. Cl. .................................................... 345/420
(58) Field of Classification Search .................... None
See application file for complete search history.

(56) References Cited

U.S. PATENT DOCUMENTS

| | | | | |
|---|---|---|---|---|
| 4,894,729 A * | 1/1990 | Murayama et al. | ......... | 358/447 |
| 4,941,114 A * | 7/1990 | Shigyo et al. | ................. | 716/20 |
| 5,754,182 A * | 5/1998 | Kobayashi | .................. | 345/423 |
| 6,166,717 A * | 12/2000 | Nakayama | ................... | 345/611 |
| 6,266,062 B1 * | 7/2001 | Rivara | ......................... | 345/419 |
| 6,377,265 B1 * | 4/2002 | Bong | ........................... | 345/505 |
| 6,426,750 B1 * | 7/2002 | Hoppe | .......................... | 345/428 |
| 6,460,063 B1 * | 10/2002 | Mitsushita | .................... | 708/502 |
| 6,600,485 B1 * | 7/2003 | Yoshida et al. | ............... | 345/419 |
| 6,891,535 B2 * | 5/2005 | Perry et al. | ................... | 345/420 |
| 2002/0101428 A1 * | 8/2002 | Hsiao et al. | .................. | 345/539 |
| 2002/0167516 A1 * | 11/2002 | Loop | ............................ | 345/423 |
| 2002/0167523 A1 * | 11/2002 | Taylor et al. | ................. | 345/582 |

FOREIGN PATENT DOCUMENTS

| | | |
|---|---|---|
| JP | 05-035250 | 2/1993 |
| JP | 09-006941 | 1/1997 |
| JP | 2000-057368 | 2/2000 |
| JP | 2000-242807 | 9/2000 |

* cited by examiner

*Primary Examiner*—Ulka Chauhan
*Assistant Examiner*—Peter-Anthony Pappas
(74) *Attorney, Agent, or Firm*—Finnegan, Henderson, Farabow, Garrett & Dunner, L.L.P.

(57) ABSTRACT

An image processing apparatus able to decrease the number of minute unit graphics, able to achieve an improvement of performance of graphics drawing processing, and able to efficiently generate images, provided with a triangle generator for receiving vertex data from a geometry processor, selecting a plurality of vertexes other than predetermined end points from among 3×3 vertexes forming a mesh, judging whether each selected vertex is valid or invalid based on a distance between the selected vertex and an adjacent vertex, generating triangle data based on validity/invalidity information of each vertex, and outputting the same via a triangle buffer to a triangle drawing device.

8 Claims, 20 Drawing Sheets

FISSURE FORMED

NO FISSURE

IMAGE PROCESSING APPARATUS AND METHOD OF SAME

BACKGROUND OF THE INVENTION

1. Field of the Invention

The present invention relates to an image processing apparatus for expressing a model by a combination of unit graphics and a method of the same.

2. Description of the Related Art

Along with the improvement in operating speeds and strengthening of graphics generation functions in recent computer systems, computer graphics (CG) technology for preparing and processing graphics and images using computer resources is being actively researched and developed and being put into practical use.

For example, in three-dimensional graphics, the optical phenomenon when a three-dimensional object is illuminated by a predetermined light source is expressed by a mathematical model and the surface of the object is given shading or brightness or further given a texture based on this model so as to generate a more realistic, three-dimensional-like two-dimensional high definition image. Such computer graphics is now being increasingly actively used in CAD/CAM and other fields of application in science, engineering, manufacturing, etc.

Three-dimensional graphics is generally comprised by a "geometry sub-system" positioned as the front end and a "raster sub-system" positioned as the back end.

The geometry sub-system is a step of geometric processing of the position, posture, etc. of the three-dimensional object displayed on a display screen. In the geometry sub-system, an object is generally treated as an aggregate of a large number of polygons. Geometric processing such as "coordinate conversion", "clipping", and "light source computation" are carried out in units of polygons.

On the other hand, the raster sub-system is a step of painting each pixel composing the object. Rasterization is realized by for example interpolating image parameters of all pixels included inside a polygon based on the image parameters found for every vertex of the polygon. The image parameters referred to here include color (graphics drawing color) data expressed by the so-called RGB format or the like, a z-value expressing a distance in a depth direction, and so on. Further, in recent high definition three-dimensional graphics processing, "f" (fog) for giving a perspective feeling, a texture "t" for expressing the feeling of a material or texture of the object surface to impart reality, etc. are included as mage parameters.

Here, the processing for generating the pixels inside a polygon from the vertex information of the polygon is executed by using a linear interpolation technique frequently referred to as a "digital differential analyzer" (DDA). In the DDA process, the inclination of data to a side direction of the polygon is found from the vertex information, the data on the side is calculated by using this inclination, then the inclination of a raster scan direction (X-direction) is calculated. The change of the parameter found from this inclination is added to the parameter value of a start point of the scan so as to generate an internal pixel.

Summarizing the problems to be solved by the invention, in an image processing apparatus, however, when displaying for example data of a curved surface by tessellating the same into columns of unit graphics, minute unit graphics not reaching even one pixel in size are generated. In a conventional image processing apparatus, this has become one of the factors degrading the operating rate of the graphics generator.

For example, if tessellating a curved surface into columns of triangles, as shown in FIG. 1, the number of minute triangles increases. In some cases, as indicated by the hatching in FIG. 1, triangles not having pixels are generated when drawing. Such a so-called 0 pixel triangle (triangle not including the center of a pixel) causes a drop in the performance of a drawing device.

Further, adaptively generating triangles without using a regular pattern for the curved surface data shown in FIG. 2A for example, as indicated by the hatching in FIG. 2B, a fissure occurs in the curved surface. Accordingly, in a conventional image processing apparatus, where adaptively generating triangles without using a regular pattern, as shown in FIG. 2C, it is necessary to take care not to generate a fissure, so there are the disadvantages that there are constraints on the processing and complex processing is required.

SUMMARY OF THE INVENTION

An object of the present invention is to provide an image processing apparatus able to decrease the number of minute unit graphics, able to achieve an improvement of performance of the graphics drawing processing of a drawing device, and able to efficiently draw images, and a method of the same.

To attain the above object, according to a first aspect of the present invention, there is provided an image processing apparatus for expressing a primitive as a combination of a plurality of unit graphics formed by connecting a plurality of vertexes and drawing the unit graphics in a memory, comprising a unit graphic generator for judging whether or not a formed unit graphic can include the center of a pixel generated in a graphics drawing target region of a screen coordinate system when forming a unit graphic by connecting vertexes based on a plurality of vertex data, judging that the plurality of vertexes able to form a unit graphic including the center of that pixel to be valid vertexes, and generating the unit graphic data based on the valid vertex information and a drawing device for receiving the unit graphic data generated at the unit graphic generator and drawing at least one unit graphic.

According to a second aspect of the present invention, there is provided an image processing apparatus for expressing a primitive as a combination of a plurality of unit graphics formed by connecting a plurality of vertexes, generating pixels in a graphics drawing target region of a screen coordinate system, and drawing the unit graphics in a memory, comprising a unit graphic generator for selecting a plurality of vertexes other than predetermined end points from among a plurality of vertex data able to form a predetermined shape, judging whether or not each selected vertex is valid or invalid based on a distance between the selected vertex and an adjacent vertex, and generating unit graphic data based on validity/invalidity information of each vertex and a drawing device for receiving the unit graphic data generated at the unit graphic generator and drawing at least one unit graphic.

In the present invention, the unit graphic generator judges a vertex as valid when the distance between each selected vertex and the adjacent vertex is at least a constant value set in advance and judges it as invalid when the distance is less than the constant value.

Preferably, the unit graphic generator judges a vertex as valid when a sum of distances between each selected vertex and a plurality of adjacent vertexes is at least a constant value set in advance and judges it as invalid when the sum is less than the constant value.

Further, in the present invention, the plurality of vertex data supplied to the unit graphic generator forms a predetermined matrix, and the unit graphic generator includes a center point validity judgment circuit for selectively receiving as input data relating to a vertex located at the center of the matrix among a supplied plurality of vertex data other than the end points and data relating to a plurality of adjacent vertexes adjacent to that center vertex, judging whether or not a sum of distances between the center vertex and the plurality of adjacent vertexes is at least a constant value set in advance, outputting data meaning that the center vertex is valid when judging that the sum is at least the constant value and outputting data meaning that the center vertex is invalid when judging that the sum is less than the constant value; a plurality of side middle point validity judgment circuits for each receiving as input data relating to a vertex forming the center of a side among a plurality of vertexes arranged in a same row or column not including the center vertex of the matrix and composing a predetermined side and a plurality of vertexes adjacent to that side middle vertex, judging whether or not the sum of distances between the side middle vertex and the plurality of adjacent vertexes is at least a constant value set in advance, outputting data meaning that the side middle vertex is valid when judging that the sum is at least the constant value, and outputting data meaning the data is invalid when judging that the sum is less than the constant value; and an inter-vertex adjacent relationship data generation circuit for generating adjacent relationship data among vertexes in accordance with the number of data indicating validity among the plurality of validity/invalidity data based on the validity/invalidity data by the center point validity judgment circuit, the validity/invalidity data by the side middle point validity judgment circuit, and the supplied plurality of vertex data and generating unit graphic data in accordance with the generated adjacent relationship data.

Further, in the present invention, the plurality of vertex data supplied to the unit graphic generator is data after geometry processing.

Further, in the present invention, the plurality of vertex data supplied to the unit graphic generator is data including only two-dimensional coordinates in the screen coordinate system, and the apparatus further comprises a geometry processor for geometry processing with respect to the unit graphic data generated by the unit graphic generator and supplying the unit graphic data after the geometry processing to the drawing device.

According to a third aspect of the present invention, there is provided an image processing method for expressing a primitive as a combination of a plurality of unit graphics formed by connecting a plurality of vertexes and drawing the unit graphics in a memory, comprising a first step of judging whether or not a formed unit graphic can include the center of a pixel generated in a graphics drawing target region of a screen coordinate system when forming a unit graphic by connecting vertexes based on a plurality of vertex data and judging that a plurality of vertexes able to form a unit graphic including the center of the pixel are valid vertexes; a second step of generating the unit graphic data based on valid vertex information of the first step; and a third step of receiving the unit graphic data generated by the second step and drawing at least one unit graphic.

In the present invention, the plurality of vertex data used for the judgment processing of the first step is data after geometry processing.

Further, in the present invention, the plurality of vertex data used for the judgment processing of the first step is data including only two-dimensional coordinates in a screen coordinate system, the method further has a fourth step of geometry processing with respect to the unit graphic data generated at the second step between the second step and third step, and the unit graphic after the geometry processing is drawn in the third step.

According to a fourth aspect of the present invention, there is provided an image processing method for expressing a primitive as a combination of a plurality of unit graphics formed by connecting a plurality of vertexes, generating pixels inside a graphics drawing target region of a screen coordinate system, and drawing the unit graphics in a memory, comprising a first step of selecting a plurality of vertexes other than predetermined end points from among a plurality of vertex data able to form a predetermined shape and judging whether each selected vertex is valid or invalid based on a distance between the selected vertex and an adjacent vertex; a second step of generating unit graphic data based on validity/invalidity information of each vertex of the first step; and a third step of receiving the unit graphic data formed at the second step and drawing at least one unit graphic.

In the present invention, at the first step, a vertex is judged as valid when the distance between each selected vertex and an adjacent vertex is at least a constant value set in advance and judged as invalid when the distance is less than the constant value.

Preferably, in the first step, a vertex is judged as valid when a sum of distances between each selected vertex and a plurality of adjacent vertexes is at least a constant value set in advance and judged as invalid when the distance is less than the constant value.

In the present invention, the plurality of vertex data used for the judgment processing of the first step forms a predetermined matrix, the first step includes a fourth step of selectively receiving as input data relating to a vertex located at the center of the matrix among the supplied plurality of vertex data other than the end points and a plurality of adjacent vertexes adjacent to that center vertex and judging whether or not a sum of distances between the center vertex and the plurality of adjacent vertexes is at least a constant value set in advance, a fifth step of outputting data meaning that the center vertex is valid when judging in the fourth step that the sum is at least the constant value and outputting data meaning that the center vertex is invalid when judging that the sum is less than the constant value, a sixth step of selectively receiving as input data relating to a vertex forming the center of a side among a plurality of vertexes arranged in the same row,or column not including the center vertex of the matrix and composing a predetermined side and a plurality of vertexes adjacent to that side middle vertex and judging whether or not the sum of distances between the side middle vertex and the plurality of adjacent vertexes is at least a constant value set in advance, and a seventh step of outputting data meaning that the center vertex is valid when judging in the sixth step that the sum is at least a constant value and outputting data meaning it is invalid when judging that the sum is less than the constant value for every side, and the second step includes an eighth step of generating adjacent relationship data among vertexes in accordance with the number of data indicating validity among the plurality of validity/invalidity data based on the validity/invalidity data by the fifth step, the validity/invalidity data by the seventh step, and the supplied plurality of validity/invalidity data and a ninth step of generating unit graphic data in accordance with the adjacent relationship data generated at the eighth step.

According to the present invention, the vertex data generated on for example an upper significant side is subjected to geometry processing, and the vertex data after the geometry processing is supplied to the unit graphic generator. In the unit graphic generator, a plurality of vertexes other than the predetermined end points is selected from among a plurality of vertex data able to form a predetermined shape and it is judged whether each selected vertex is valid or invalid based on the distance between the selected vertex and an adjacent vertex. Further, the unit graphic data is generated based on the validity/invalidity information of each vertex and supplied to the drawing device. Along with this, in the drawing device, the generated unit graphic data is received and at least one unit graphic is drawn.

Further, according to the present invention, the vertex data generated at for example the upper significant side is converted to data including only two-dimensional coordinates in a screen coordinate system and supplied to the unit graphic generator. In the unit graphic generator, a plurality of vertexes other than the predetermined end points is selected from among a plurality of vertex data able to form a predetermined shape, and it is judged whether each selected vertex is valid or invalid based on the distance between the selected vertex and an adjacent vertex. Then, the unit graphic data is generated based on the validity/invalidity information of each vertex and supplied to the geometry processor. In the geometry processor, the unit graphic data is subjected to geometry processing, and the vertex data after the geometry processing is supplied to the drawing device. Along with this, in the drawing device, the generated unit graphic data is received and at least one unit graphic is drawn.

BRIEF DESCRIPTION OF THE DRAWINGS

These and other objects and features of the present invention will become clearer from the following description of the preferred embodiments given with reference to the accompanying drawings, wherein:

FIGS. 20A to 20C are views for conceptually explaining a storage method of display data, depth data, and texture data in a graphics memory according to the present embodiment.

DESCRIPTION OF THE PREFERRED EMBODIMENTS

Preferred embodiments of the present invention will be described in detail below while referring to the attached figures. In the embodiments, an explanation will be given of a three-dimensional computer graphics system, applied to a personal computer etc., for displaying a desired three-dimensional image for any three-dimensional object model on a display (monitor) such as a cathode ray tube (CRT) at a high speed.

First Embodiment

Figure 3:
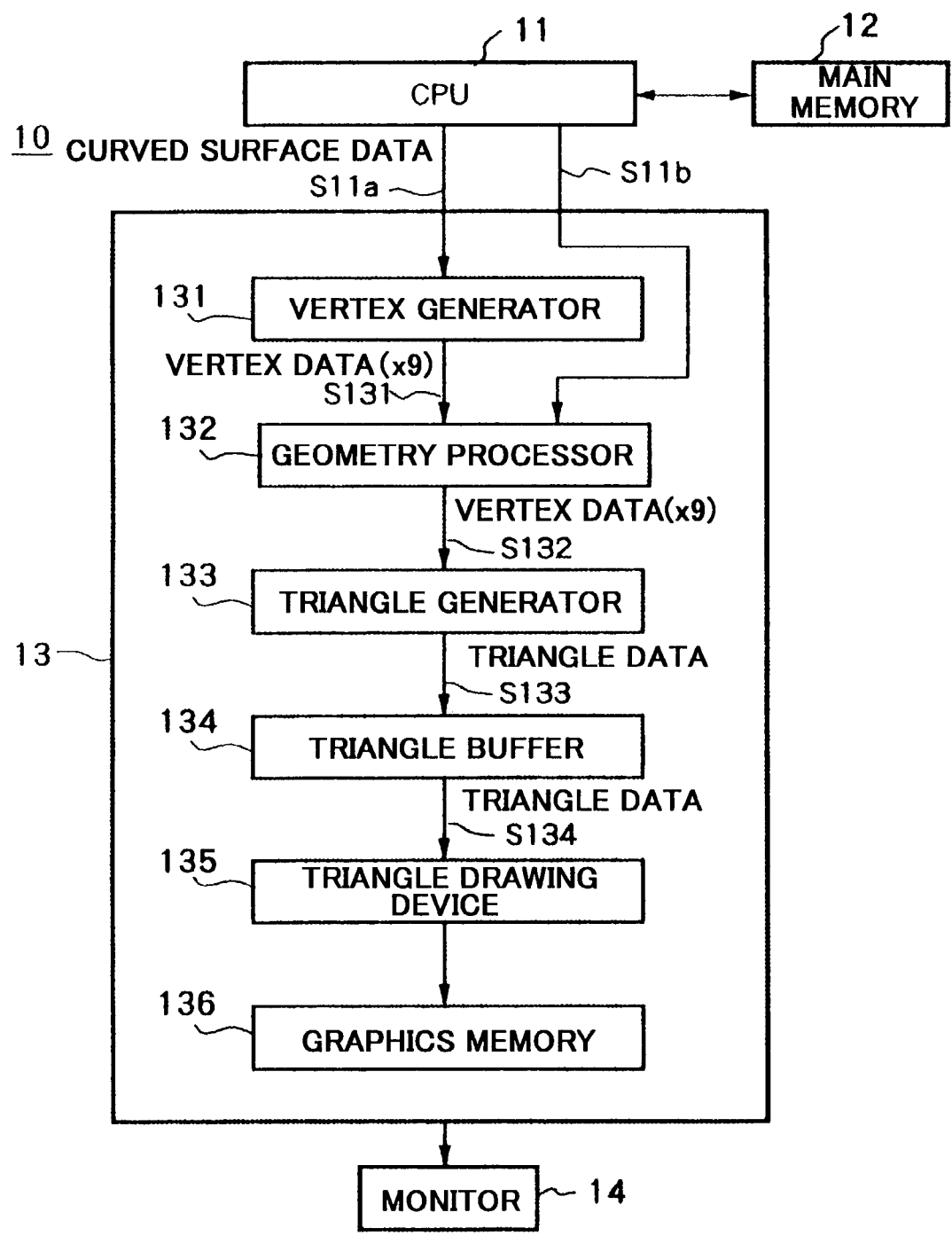
FIG. 3 is a view of the system configuration of a three-dimensional computer graphics system as an image processing apparatus according to the present invention.

FIG. 3 is a view of the system configuration of a first embodiment of a three-dimensional computer graphics system 10 as an image processing apparatus according to the present invention.

The three-dimensional computer graphics system 10 is a system for polygon rendering for expressing a cubic model (primitive) as a combination of unit graphics, that is, triangles (polygons or triangles), determining the color of each pixel of the display screen by drawing these polygons, and displaying the same on a display. Further, the three-dimensional computer graphics system 10 expresses the three-dimensional object by using a z-coordinate for expressing the depth in addition to (x, y) coordinates for expressing a position on a plane and specifies any point in a three-dimensional space by these three coordinates (x, y, z).

As shown in FIG. 3, the three-dimensional computer graphics system 10 has a main processor (CPU) 11, a main memory 12, a graphics processor 13, and a monitor 14 such as a CRT.

The main processor 11 reads out required graphics data from the main memory 12 in accordance with for example the state of progress of an application, applies predetermined processing to this graphics data to generate curved surface data S11a, and outputs the same to the graphics processor 13. Further, the main processor 11 reads out the required graphics data from the main memory 12, applies predetermined processing to this graphics data to generate vertex data (x9) S11b of nine points of a so-called world coordinate system, and outputs the same to the graphics processor 13.

The graphics processor 13 has a vertex generator 131, a geometry processor 132, a triangle generator 133, a triangle buffer 134, a triangle drawing device 135 and a graphics memory 136.

The vertex generator 131 receives the curved surface data S11a supplied by the main processor 11, generates vertex data S131 from a control point of the curved surface data S11a, and outputs the same to the geometry device 132.

The geometry processor 132 performs coordinate conversion, clipping, lighting, and other geometry processing on the vertex data S131 from the vertex generator 131 or the vertex data S11b from the main processor 11, generates vertex data S132 of nine points converted from the world coordinate system to the screen coordinate system, and outputs the same to the triangle generator 133.

The triangle generator 133 receives a plurality of vertex data S132 from the geometry, processor 132, judges whether or not a formed triangle can include the center of a pixel generated inside a graphics drawing target region of the screen coordinate system when forming a triangle (unit graphic) by connecting vertexes, judges that a plurality of vertexes able to form the triangle including the center of that pixel are valid vertexes, generates triangle data S133 based on this valid vertex information, and outputs the same via the triangle buffer 134 to the triangle drawing device 135. Specifically, the triangle generator 133 receives a plurality of vertex data S132 able to form a predetermined shape (or matrix) from the geometry processor 132, selects a plurality of vertexes other than the predetermined end points from among 3×3 vertexes for forming a so-called mesh, judges whether each selected vertex is valid or invalid based on the distance between the selected vertex and an adjacent vertex, generates triangle data (polygon rendering data) S134 based on the validity/invalidity information of each vertex, and outputs the same via the triangle buffer 134 to the triangle drawing device 135.

Figure 4:
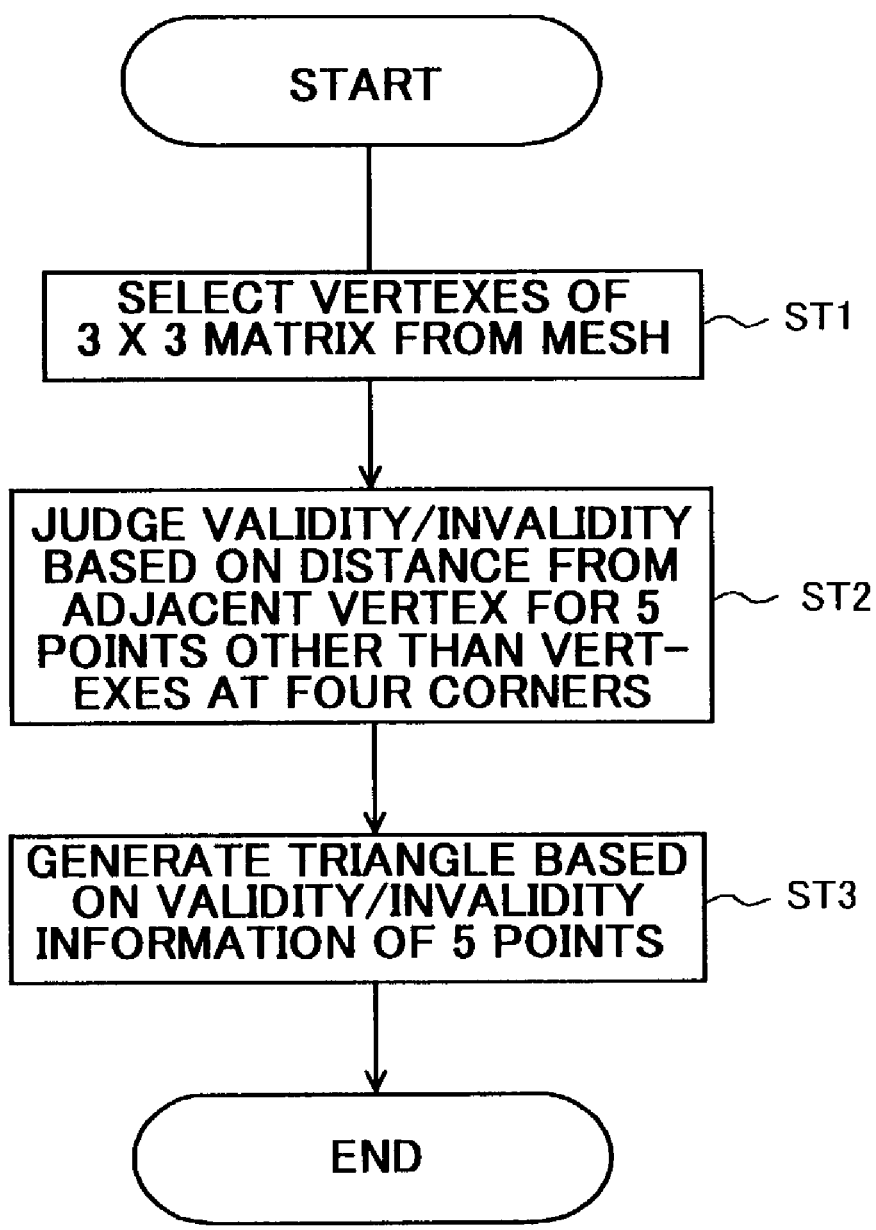
FIG. 4 is a flow chart of explaining the processing in a triangle generator according to an embodiment of the present invention.

FIG. 4 is a flow chart for explaining the processing in the triangle generator 133 according to the present embodiment. Further, FIG. 5 is a view conceptually showing the processing corresponding to the steps of FIG. 4.

Step ST1

Figure 5A:
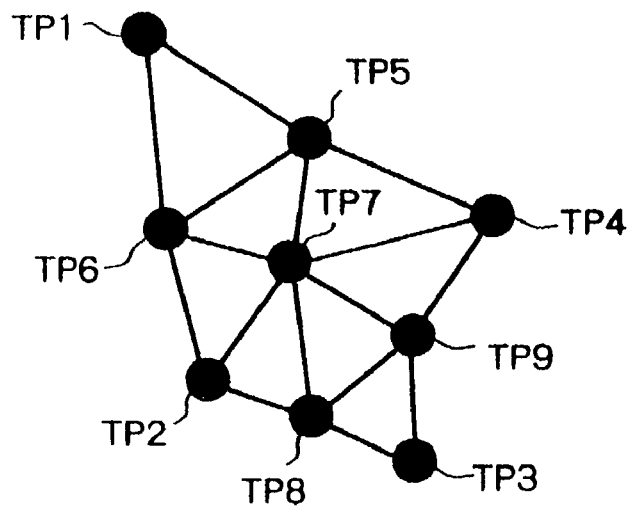
FIGS. 5A to 5C are view conceptually showing processing corresponding to steps of FIG. 4.

The triangle generator 133 selects vertexes TP1 to TP9 of the 3×3 matrix composing the mesh shown in FIG. 5A at step ST1.

Step ST2

Figure 5B:
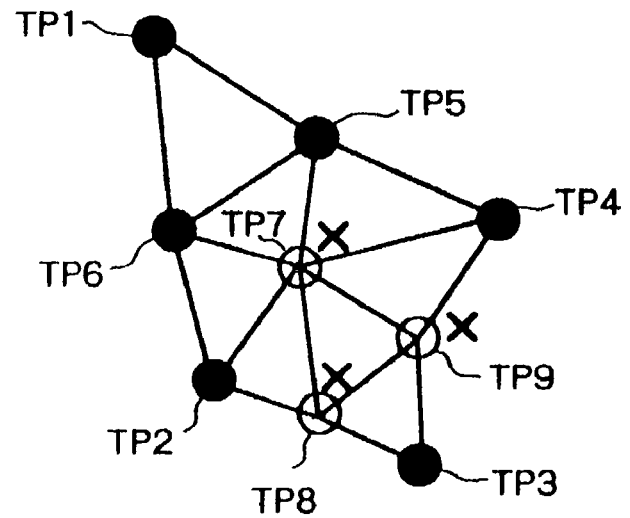

At step ST2, the generator judges for the five vertexes TP5 to TP9 other than the vertexes TP1 to TP4 of the four corners whether the vertexes are valid or invalid based on the distance between them and adjacent vertexes. Specifically, it judges a vertex as valid if the distance between the vertex and the adjacent vertex (or the sum of distances between the vertex and the adjacent plurality of vertexes) is at least a constant value and judged it as invalid if the distance is less than the constant value. In the example of FIG. 5B, it judges that the two vertexes TP5 and TP6 among the selected five vertexes TP5 to TP9 are valid since the distances between these and adjacent vertexes, for example, TP1, are at least the constant value. On the other hand, it judges the three vertexes TP7, TP8, and TP9 among the selected five vertexes as invalid since the distances between these and adjacent vertexes, for example, TP2 and TP3, are less than the constant value.

Step ST3

Figure 5C:
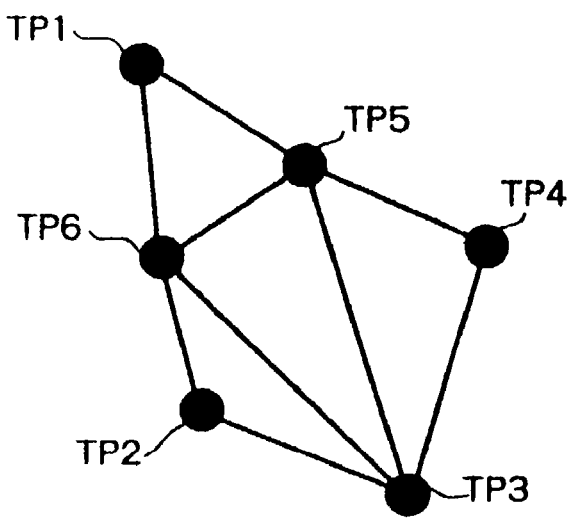

At step ST3, the generator generates the triangle data as shown in FIG. 5C based on the validity/invalidity information relating to the five vertexes TP5 to TP9 other than the four corners. In this case, as shown in FIG. 5C, it connects the vertex TP5 and vertex TP3 and the vertex TP6 and vertex TP3 to generate four triangles. These generated triangles are all triangles having pixels when drawn, that is, are not 0 pixel triangles (triangles not including centers of pixels).

Figure 6:
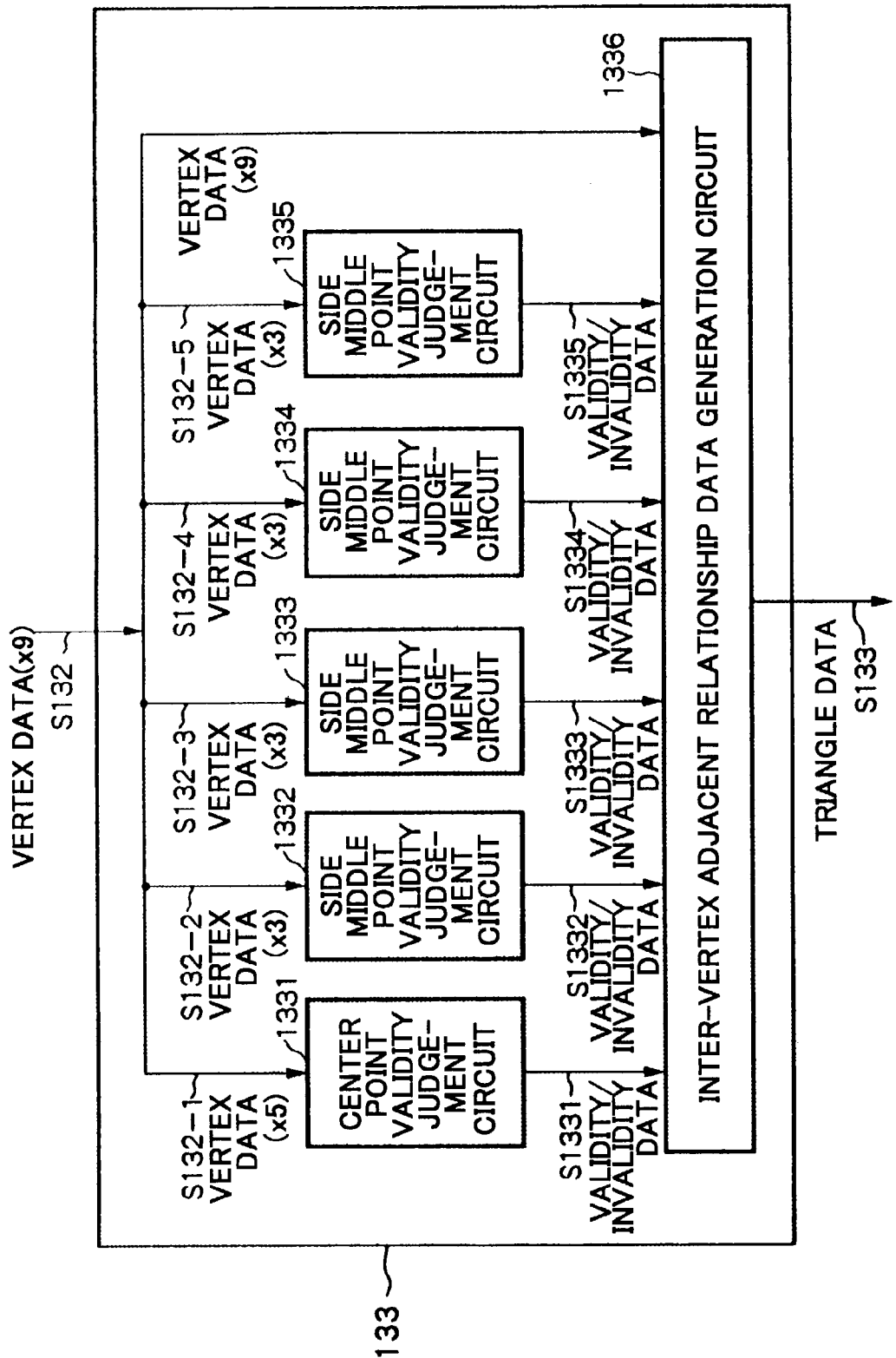
FIG. 6 is a block diagram of an example of the configuration of a triangle generator according to the present embodiment.

FIG. 6 is a block diagram of an example of the configuration of the triangle generator 133.

The triangle generator 133 has, as shown in FIG. 6, a center point validity judgment circuit 1331, side middle point validity judgment circuits 1332 to 1335, and an inter-vertex adjacent relationship data generation circuit 1336.

Figure 7:
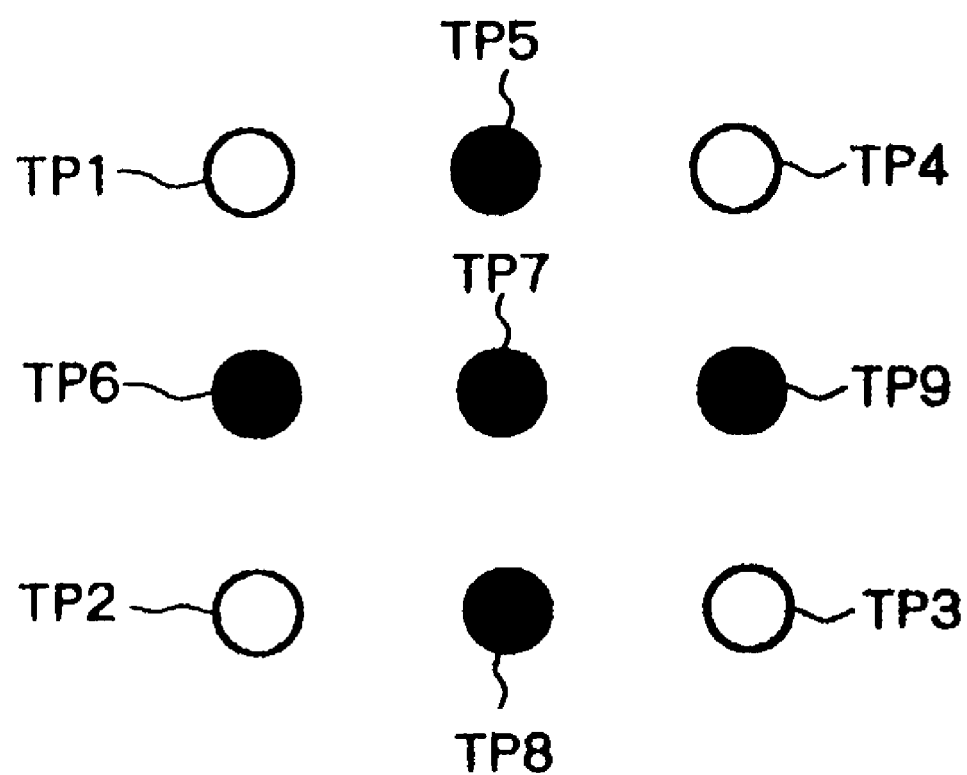
FIG. 7 is a view for explaining processing of a center point validity judgment circuit in the triangle generator of FIG. 6.
Figure 8:
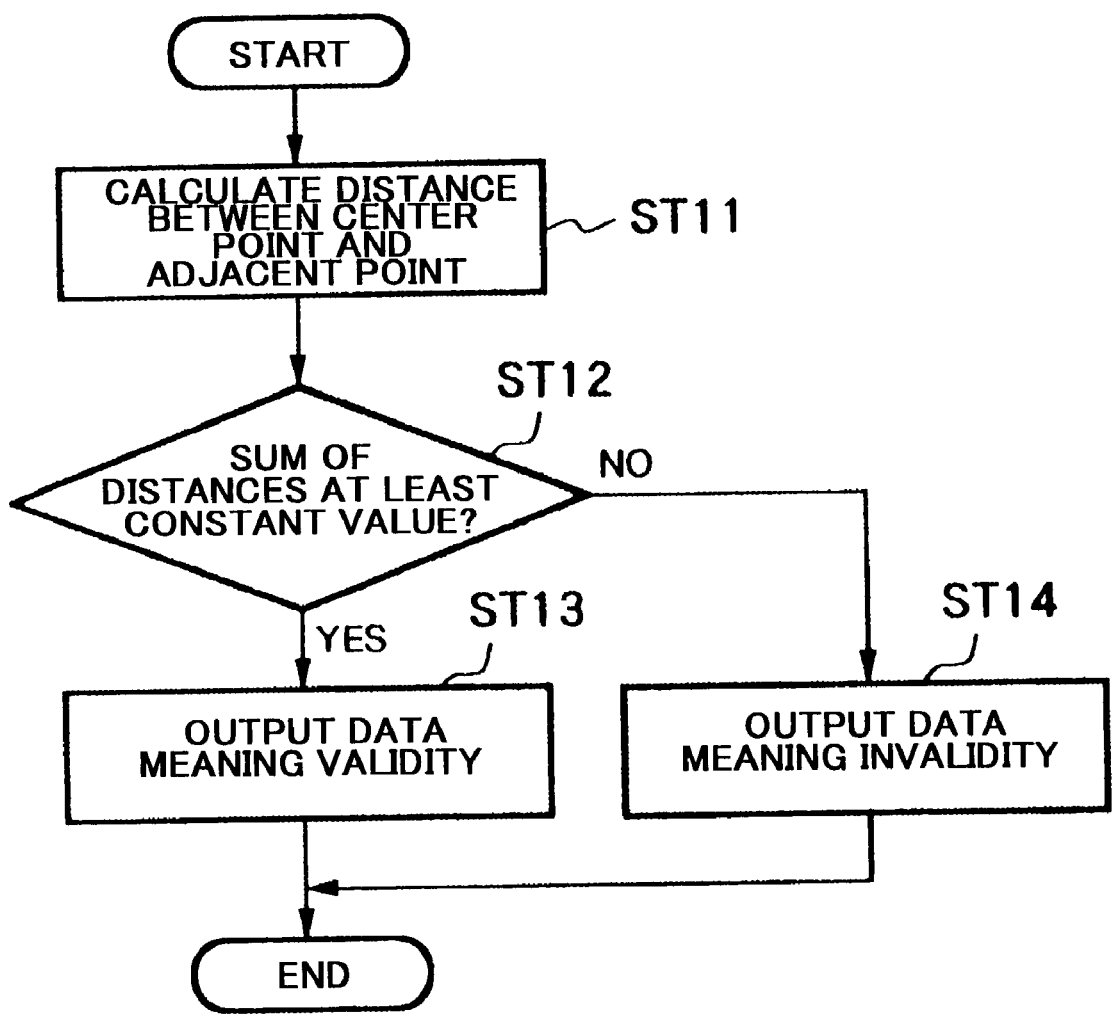
FIG. 8 is a flow chart for explaining processing of the center point validity judgment circuit in the triangle generator of FIG. 6.

The center point validity judgment circuit 1331 selectively receives as input data S132-1 relating to the vertex TP7 located at the center of the 3×3 matrix and the vertexes TP5, TP6, TP8, and TP9 adjacent to the vertex TP7 vertically and horizontally as shown in FIG. 7 among the nine vertex data S132 of the screen coordinate system by the geometry processor 132 and performs the processing as shown in the flow chart of FIG. 8.

Namely, the center point validity judgment circuit 1331 calculates distances between the center point TP7 and the adjacent points TP5, TP6, TP8, and TP9 (step ST11). Next, it judges whether or not the sum of calculated distances between the center point TP7 and adjacent points TP5, TP6, TP8, and TP9 is at least a constant value set in advance (step ST12). When judging at step ST12 that the sum of distances between the center point TP7 and adjacent points TP5, TP6, TP8, and TP9 is at least the constant value, it outputs data S1331 meaning validity to the inter-vertex adjacent relationship data generation circuit 1336 (ST13). On the other hand, when judging at step ST12 that the sum of the distances between the center point TP7 and adjacent points TP5, TP6, TP8, and TP9 is less than the constant value, it outputs data S1331 meaning invalidity to the inter-vertex adjacent relationship data generation circuit 1336 (ST14).

Figure 9:
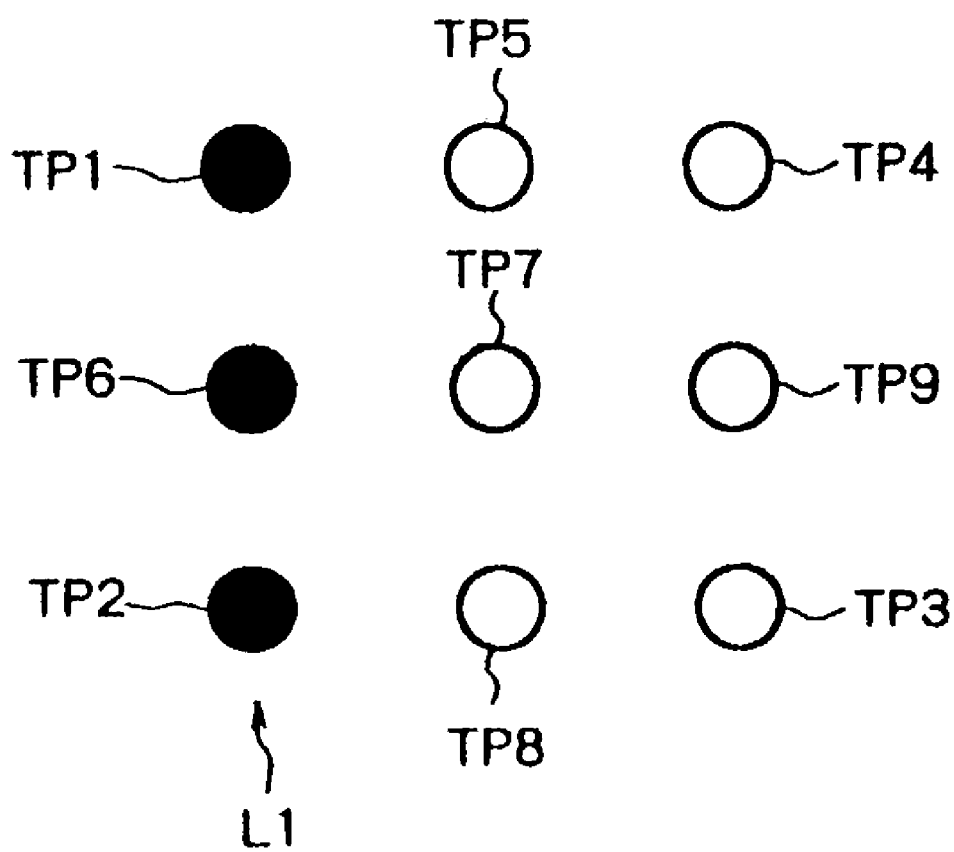
FIG. 9 is a view for explaining processing of a side middle point validity judgment circuit in the triangle generator of FIG. 6.
Figure 10:
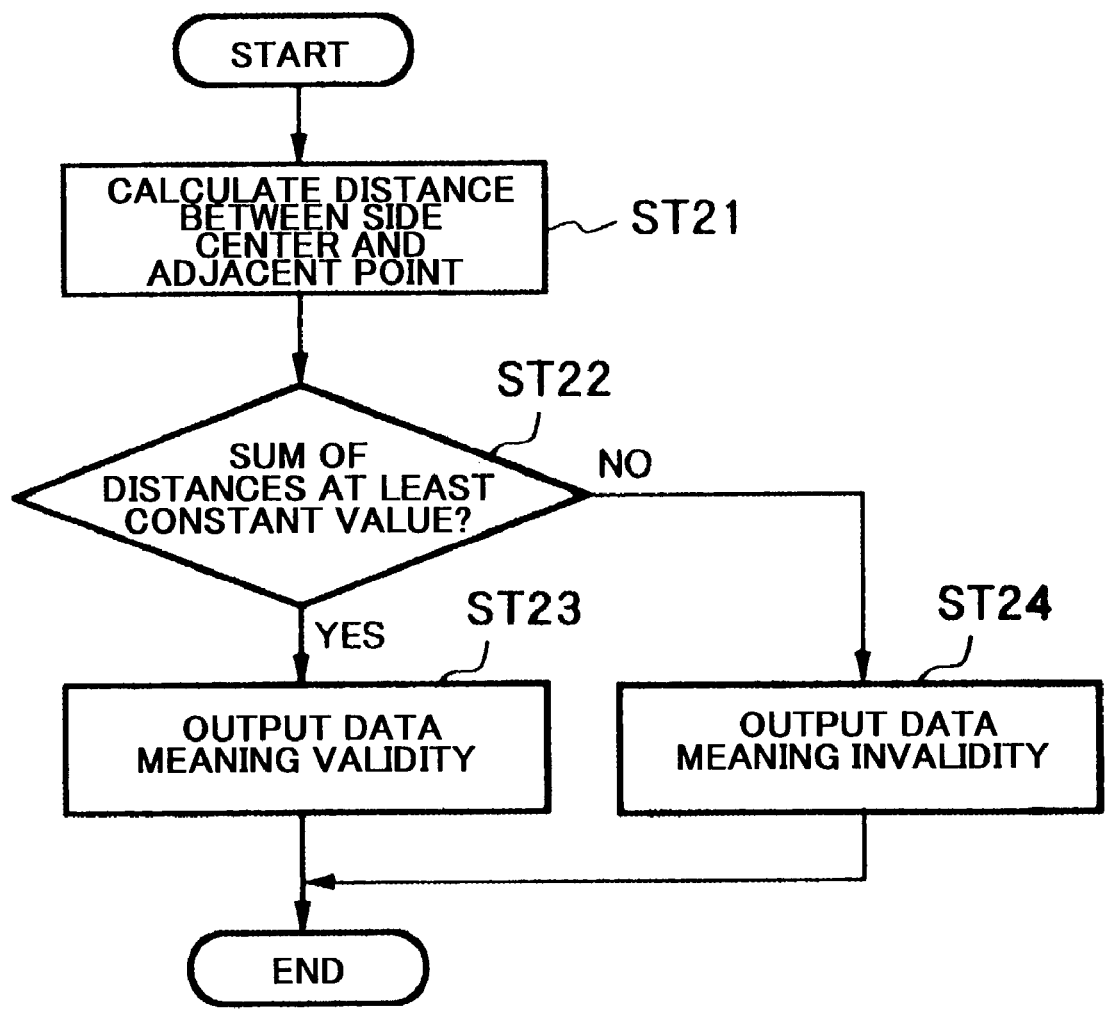
FIG. 10 is a flow chart for explaining processing of the side middle point validity judgment circuit in the triangle generator of FIG. 6.

The side middle point validity judgment circuit 1332 selectively receives as input data S132-2 relating to three vertexes arranged in the same row or column composing the 3×3 matrix, not including the center point TP7, and composing a first side L1 among four sides of a square, that is, the vertexes TP1 and TP2 located at the two ends of the first side L1 and the side middle point TP6 of them, among nine vertex data S132 of the screen coordinate system shown in FIG. 9 by the geometry processor 132 and performs the processing shown in the flow chart of FIG. 10.

Namely, the side middle point validity judgment circuit 1332 calculates the distances between the side middle point TP6 and the adjacent points (end points) TP1 and TP2 (step ST21). Next, it judges whether or not the sum of calculated distances between the side middle point TP6 and the adjacent points TP1 and TP2 is at least a constant value set in advance (step ST22). When it judges at step ST22 that the sum of distances between the side middle point TP6 and the adjacent points TP1 and TP2 is at least the constant value, it outputs data S1332 meaning validity to the inter-vertex adjacent relationship data generation circuit 1336 (ST23). On the other hand, when it judges at step ST22 that the sum of distances between the side middle point TP6 and the adjacent points TP1 and TP2 is less than the constant value, it outputs the data S1332 meaning invalidity to the inter-vertex adjacent relationship data generation circuit 1336 (ST24).

Figure 11:
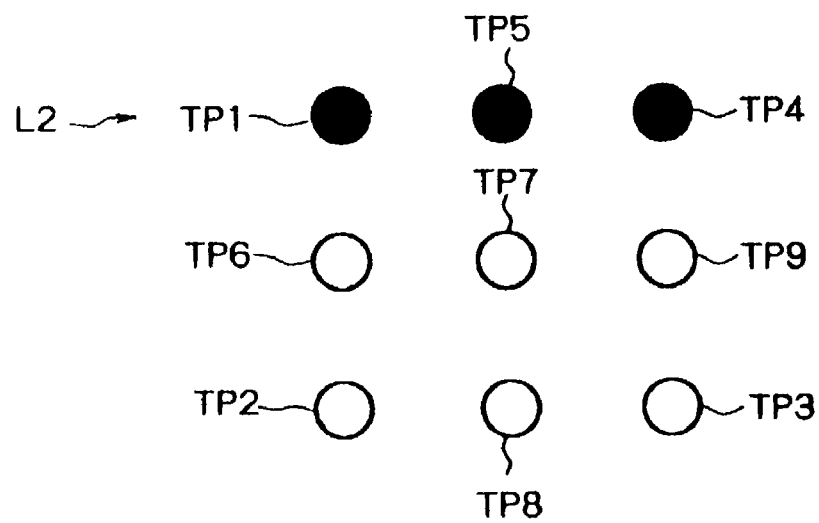
FIG. 11 is a view for explaining processing of the another side middle point validity judgment circuit in the triangle generator of FIG. 6.

The side middle point validity judgment circuit 1333 selectively receives as input data S132-3 relating to three vertexes arranged in the same row or column composing the 3×3 matrix, not including the center point TP7, and composing a second side L2 among the four sides of the square, that is, the vertexes TP1 and TP4 located at the two ends of the second side L2 and the side middle point TP5 of them among nine vertex data S132 of the screen coordinate system shown in FIG. 11 by the geometry processor 132 and performs the processing as shown in the flow chart of FIG. 10.

Namely, the side middle point validity judgment circuit 1333 calculates the distances between the side middle point TP5 and the adjacent points (end points) TP1 and TP4 (step ST21). Next, it judges whether or not the sum of calculated distances between the side middle point TP5 and the adjacent points TP1 and TP4 is at least at constant value set in advance (step ST22). When it judges at step ST22 that the sum of distances between the side middle point TP5 and the adjacent points TP1 and TP4 is at least the constant value, it outputs data S1333 meaning validity to the inter-vertex adjacent relationship data generation circuit 1336 (ST23). On the other hand, when it judges at step ST22 that the sum of distances between the side middle point TP5 and the adjacent points TP1 and TP4 is less than the constant value, it outputs data S1333 meaning invalidity to the inter-vertex adjacent relationship data generation circuit 1336 (ST24).

Figure 12:
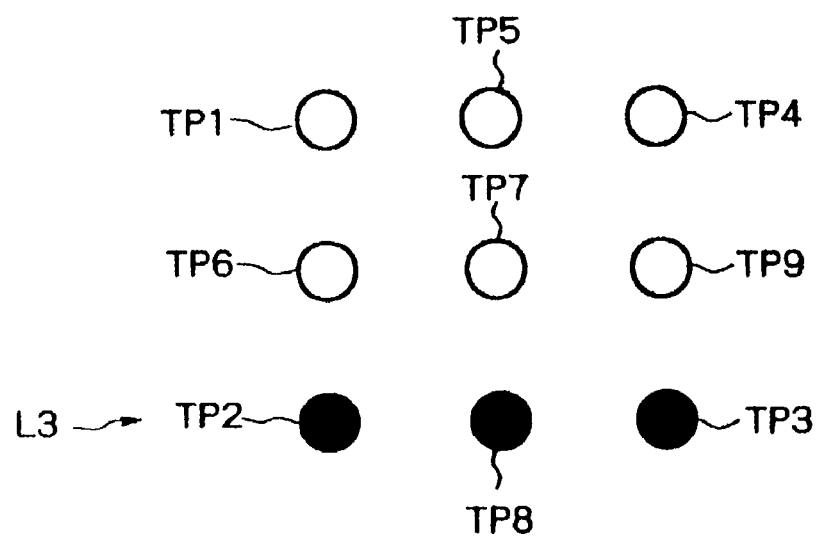
FIG. 12 is a view for explaining processing of another side middle point validity judgment circuit in the triangle generator of FIG. 6.

The side middle point validity judgment circuit 1334 selectively receives as input data S132-4 relating to three vertexes arranged in the same row or column composing the 3×3 matrix, not including the center point TP7, and composing a third side L3 among the four sides of the square, that is, the vertexes TP2 and TP3 located at the two ends of the third side L3 and the side middle point TP8 of them among the nine vertex data S132 of the screen coordinate system shown in FIG. 12 by the geometry processor 132 and performs the processing as shown in the flow chart of FIG. 10.

Namely, the side middle point validity judgment circuit 1334 calculates the distances between the side middle point TP8 and the adjacent points (end points) TP2 and TP3 (step ST21). Next, it judges whether or not the sum of calculated distances between the side middle point TP8 and the adjacent points TP2 and TP3 is at least a constant value set in advance (step ST22). When it judges at step ST22 that the sum of distances between the side middle point TP8 and the adjacent points TP2 and TP3 is at least the constant value, it outputs data S1334 meaning validity to the inter-vertex adjacent relationship data generation circuit 1336 (ST23). On the other hand, when it judges at step ST22 that the sum of distances between the side middle point TP8 and the adjacent points TP2 and TP3 is less than the constant value, it outputs data S1334 meaning invalidity to the inter-vertex adjacent relationship data generation circuit 1336 (ST24).

Figure 13:
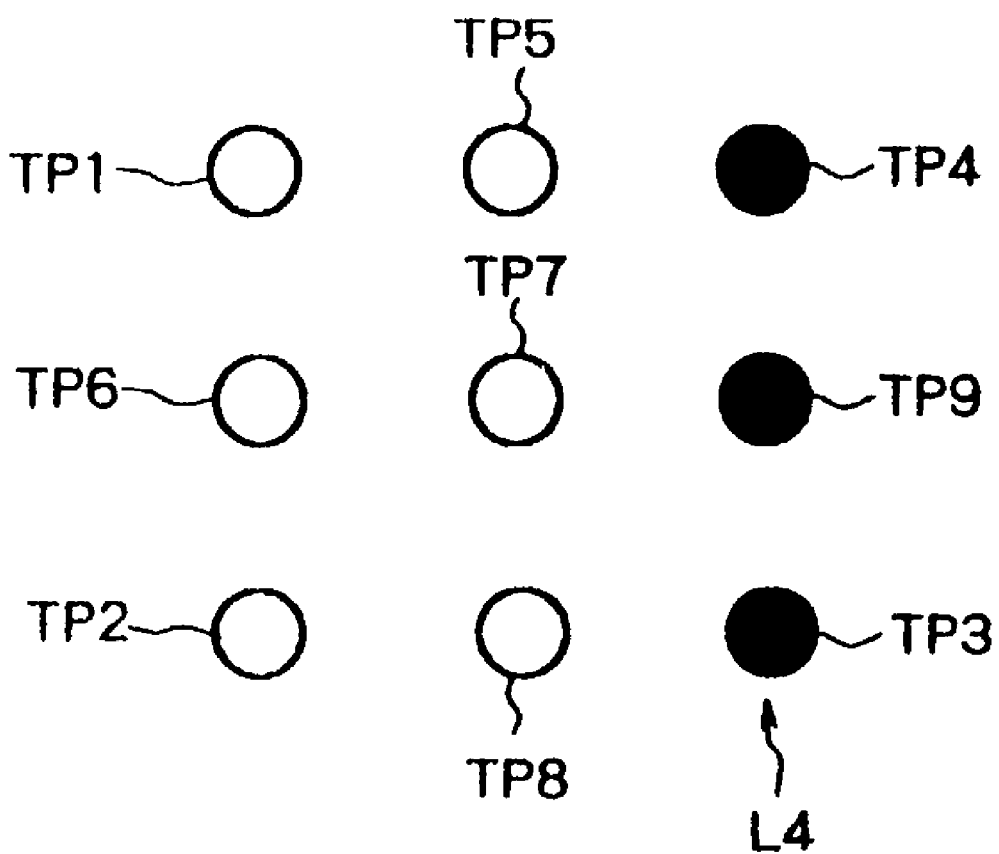
FIG. 13 is a view for explaining the processing of another side middle point validity judgment circuit in the triangle generator of FIG. 6.

The side middle point validity judgment circuit 1335 selectively receives as input data S132-5 relating to three vertexes arranged in the same row or column composing the 3×3 matrix, not including the center point TP7, and composing a fourth side L4 among the four sides of the square, that is, the vertexes TP3 and TP4 located at the two ends of the fourth side L4 and the side middle point TP9 of them among the nine vertex data S132 of the screen coordinate system shown in FIG. 13 by the geometry processor 132, and performs the processing shown in the flow chart of FIG. 10.

Namely, the side middle point validity judgment circuit 1335 calculates the distances between the side middle point TP9 and the adjacent points (end points) TP3 and TP4 (step ST21). Next, it judges whether or not the sum of the calculated distances between the side middle point TP9 and the adjacent points TP3 and TP4 is at least a constant value set in advance (step ST22). When it judges at step ST22 that the sum of distances between the side middle point TP9 and the adjacent points TP3 and TP4 is at least the constant value, it outputs data S1335 meaning validity to the inter-vertex adjacent relationship data generation circuit 1336 (ST23). On the other hand, when it judges at step ST22 that the sum of distances between the side middle point TP9 and the adjacent points TP3 and TP4 is less than the constant value, it outputs data S1335 meaning invalidity to the inter-vertex adjacent relationship data generation circuit 1336 (ST24).

The inter-vertex adjacent relationship data generation circuit 1336 generates the adjacent relationship data among vertexes in accordance with the number of the data indicating validity among the five validity/invalidity data S131 to S135 based on the five validity/invalidity data of the validity/invalidity data S1331 from the center point validity judgment circuit 1331, the validity/invalidity data S1332 from the side middle point validity judgment circuit 1332, the validity/invalidity data S1333 from the side middle point validity judgment circuit 1333, the validity/invalidity data S1334 from the side middle point validity judgment circuit 1334, and the validity/invalidity data S1335 from the side middle point validity judgment circuit 1335, and on nine vertex data S132 of the screen coordinate system from the geometry processor 132, generates triangle data in accordance with the generated adjacent relationship data, and outputs the same via the triangle buffer 134 to the triangle drawing device 135.

FIGS. 14A to 14F are views summarizing the processing of the inter-vertex adjacent relationship data generation circuit 1336.

Figure 14:
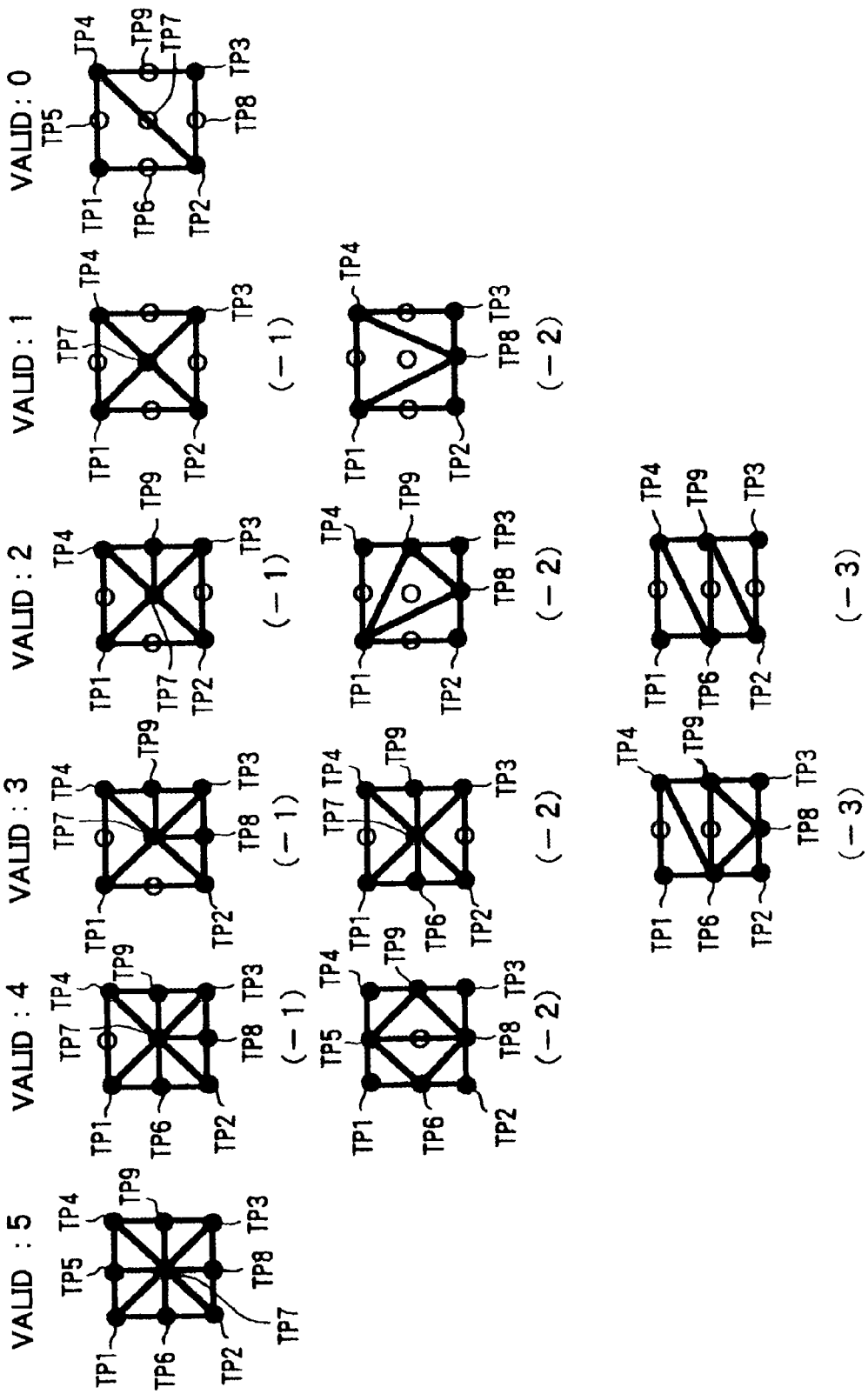
FIGS. 14A to 14F are views for explaining processing of an inter-vertex adjacent relationship data generation circuit in the triangle generator of FIG. 6.

FIG. 14A shows the processing when there is no (0) validity/invalidity data indicating validity. In this case, the inter-vertex adjacent relationship data generation circuit 1336 generates triangle data for connecting the vertexes TP2 and TP4 (or TP1 and TP3) to form two triangles since all of the five vertexes TP5 to TP9 other than the vertexes TP1 to TP4 at the four corners are invalid.

Figure 1:
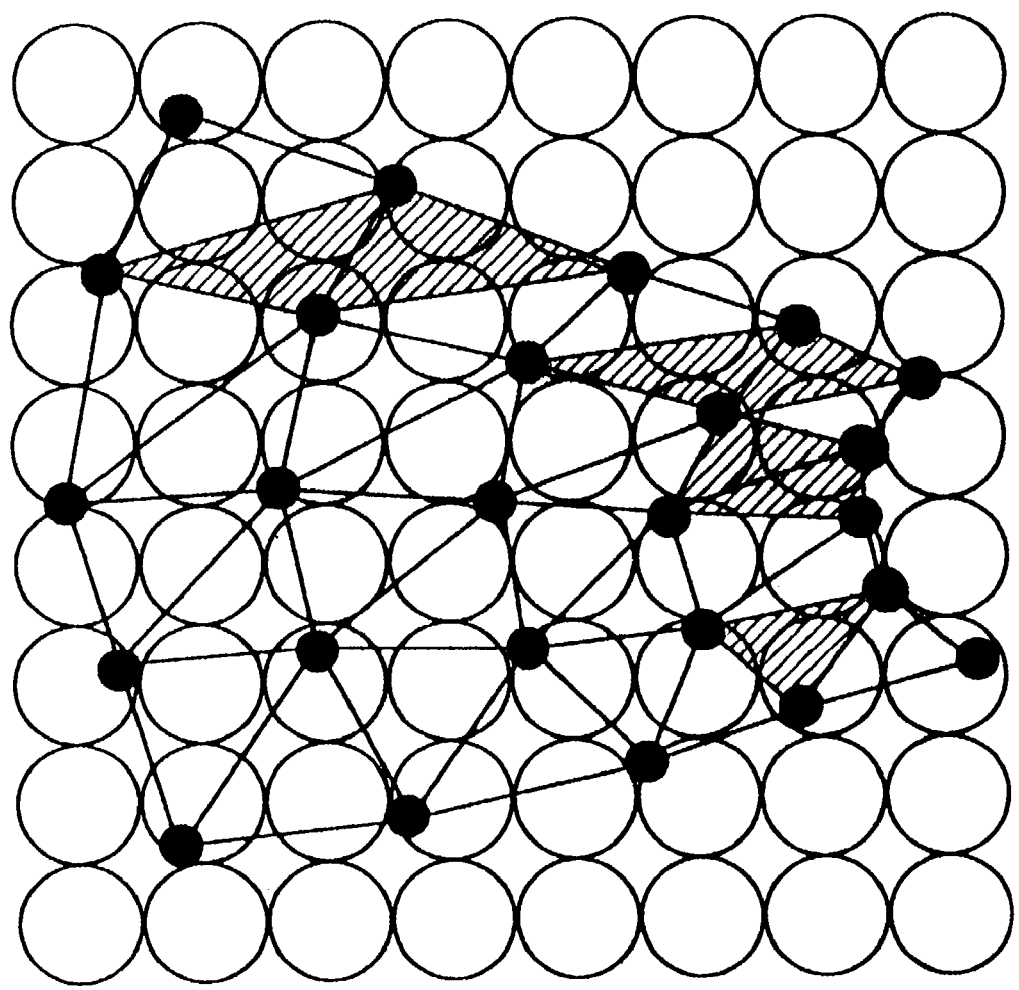
FIG. 1 is a view for explaining a problem in the prior art when tessellating curved surface data.
Figure 2B:
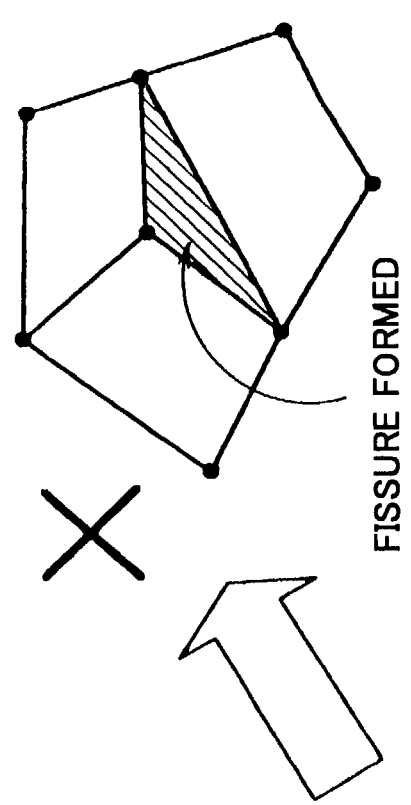
FIGS. 2A to 2C are views for explaining a problem in the prior art when generating triangles adaptively for curved surface data.
Figure 2C:
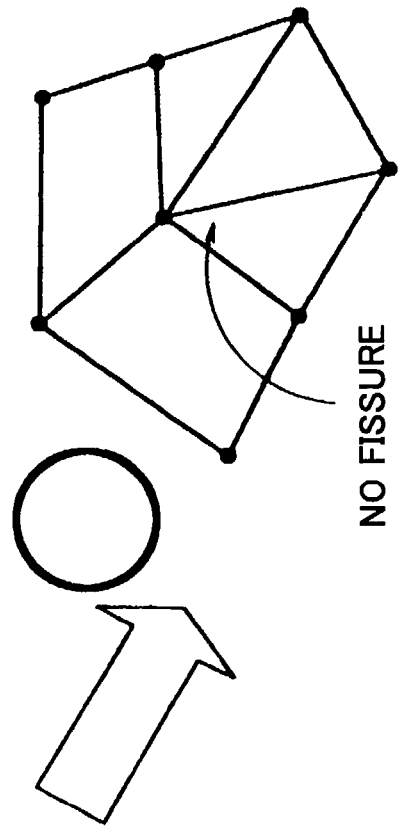
Figure 2A:
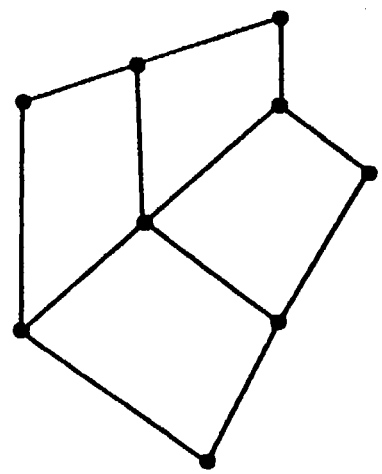

FIG. 14B shows the processing when there is one validity/invalidity data indicating validity. In this case, one of the five vertexes TP5 to TP9 other than the vertexes TP1 to TP4 at the four corners is valid, so the center point TP7 or one of the four side middle points TP5, TP6, TP8, and TP9 is valid. Accordingly, the inter-vertex adjacent relationship data generation circuit 1336 generates triangle data for connecting the vertex TP1, the center point TP7, and the vertex TP3 and connecting the vertex TP2, the center point TP7, and the vertex TP4 to form four triangles when the center point TP7 is valid as shown in FIG. 15B-1. Further, the inter-vertex adjacent relationship data generation circuit 1336 generates triangle data for connecting the vertex TP1 and the side middle point TP8 and connecting the vertex TP4 and the side middle point TP8 to form three triangles when the side middle point, for example TP8, is valid as shown in FIG. 15B-2.

FIG. 14C shows the processing when there are two validity/invalidity data indicating validity. In this case, two of the five vertexes TP5 to TP9 other than the vertexes TP1 to TP4 at the four corners are valid, so the center point TP7 and one of the four side middle points TP5, TP6, TP8, and TP9 or two of the four side middle points TP5, TP6, TP8, and TP9 are valid. Accordingly, as shown in FIG. 14C-1, the inter-vertex adjacent relationship data generation circuit 1336 generates triangle data for connecting the vertex TP1, the center point TP7, and the vertex TP3; the vertex TP2, the center point TP7, and the vertex TP4; and the center point TP7 and the side middle point TP9 to form five triangles when the center point TP7 and for example side middle point TP9 are valid. Further, as shown in FIG. 14C-2, the inter-vertex adjacent relationship data generation circuit 1336 generates triangle data for connecting the vertex TP1 and the side middle point TP8 and the vertex TP1 and the side middle point TP9 to form four triangles when the side middle points of the sides adjacent to each other, for example the side middle point TP8 of the third side L3 and the side middle point TP9 of the fourth side L4, are valid. Further, as shown in FIG. 14C-3, the inter-vertex adjacent relationship data generation circuit 1336 generates triangle data for connecting the vertex TP4 and the side middle point TP6, the side middle point TP6 and the side middle point TP9, and the vertex TP2 and the side middle point TP9 to form four triangles when the side middle points of sides opposite to each other, for example, the side middle point TP6 of the first side L1 and the side middle point TP9 of the fourth side L4, are valid.

FIG. 14D shows the processing when there are three validity/invalidity data indicating validity. In this case, three of the five vertexes TP5 to TP9 other than the vertexes TP1 to TP4 at the four corners are valid, so the center point TP7 and two of the four side middle points TP5, TP6, TP8 and TP9, or three of the four side middle points TP5, TP6, TP8, and TP9 are valid. Accordingly, as shown in FIG. 14D-1, the inter-vertex adjacent relationship data generation circuit 1336 generates triangle data for connecting the vertex TP1, the center point TP7, and the vertex TP3; the vertex TP2, the center point TP7, and the vertex TP4; the center point TP7 and the side middle point TP8; and the center point TP7 and the side middle point TP9 to form five triangles when the center point TP7 and for example side middle points of sides adjacent to each other, for example, the side middle point TP8 of the third side L3 and the side middle point TP9 of the fourth side L4, are valid, and when the side middle point TP9 is valid. Further, as shown in FIG. 14D-2, the inter-vertex adjacent relationship data generation circuit 1336 generates triangle data for connecting the vertex TP1, the center point TP7, and the vertex TP3; the vertex TP2, the center point TP7, and the vertex TP4; and the side middle point TP6, the center point TP7, and the side middle point TP9 to form six triangles when the side middle points of sides opposite to each other, for example, the side middle point TP6 of the first side L1 and the side middle point TP9 of the fourth side L4, are valid. Further, as shown in FIG. 14D-3, the inter-vertex adjacent relationship data generation circuit 1336 generates triangle data for connecting the vertex TP4 and the side middle point TP6, the side middle point TP6 and the side middle point TP9, the side middle point TP6 and the side middle point TP8, and the side middle point TP8 and the side middle point TP9 to form five triangle data when three of the four side middle points, for example, the side middle point TP6 of the first side L1, the side middle point TP8 of the third side L3, and the side middle point TP9 of the fourth side L4, are valid.

FIG. 14E shows the processing when there are four validity/invalidity data indicating validity. In this case, one of the five vertexes TP5 to TP9 other than the vertexes TP1 to TP4 at the four corners is invalid, so the center point PT7 or one of the four side middle points TP5, TP6, TP8, and TP9 is invalid. Accordingly, as shown in FIG. 14E-1, the inter-vertex adjacent relationship data generation circuit 1336 generates triangle data for connecting the vertex TP1, the center point TP7, and the vertex TP3; the vertex TP2, the center point TP7, and the vertex TP4; the side middle point TP6, the center point TP7, and the side middle point TP9; and the center point TP7 and the side middle point TP8 to form seven triangles when the side middle point, for example, TP5 is invalid. Further, as shown in FIG. 14E-2, the inter-vertex adjacent relationship data generation circuit 1336 generates triangle data for connecting the side middle point TP5 and the side middle point TP6, the side middle point TP5 and the side middle point TP9, the side middle point TP5 and the side middle point TP8, the side middle point TP6 and the side middle point TP8, and the side middle point TP8 and the side middle point TP9 to form six triangles when the center point TP7 is invalid.

FIG. 14F shows the processing when there are five validity/invalidity data indicating validity. In this case, all of the five vertexes TP5 to TP9 other than the vertexes TP1 to TP4 at the four corners are valid. Accordingly, as shown in FIG. 14F, the inter-vertex adjacent relationship data generation circuit 1336 generates triangle data for connecting the vertex TP1, the center point TP7, and the vertex TP3; the vertex TP2, the center point TP7, and the vertex TP4; the side middle point TP6, the center point TP7, and the side middle point TP9; and the side middle point TP5, the center point TP7, and the side middle point TP8 to form eight triangles.

The triangle buffer 134 holds the triangle data S133 generated by the triangle generator 133 and outputs the same as the data S134 to the triangle drawing device 135. This triangle buffer 134 is the buffer for through-put adjustment.

The triangle drawing device 135 receives the triangle data S134 to be drawn by the triangle buffer 134, performs processing such as a linear interpolation explained in detail later, draws pixel data PIX and texture data TEX in units of for example pages in the graphics memory, or reads out the display data to the monitor 14 or the like.

The triangle data (polygon rendering data) input to the triangle drawing device 135 include data (x, y, z, R, G, B, s, t, q) of three vertexes of the polygon. Here, the (x, y, z) data indicate the three-dimensional coordinates of a vertex of a triangle (polygon), and (R. G, B) data indicate luminance values of red, green, and blue at the three-dimensional coordinates. Among the (s, t, q) data, (s, t) indicate homogeneous coordinates of the corresponding texture, and "q" indicates a homogeneous term. Here, "s/q" and "t/q" are multiplied by texture sizes USIZE and VSIZE to obtain actual texture coordinate data (u, v). The texture data stored in the graphics memory (specifically the texture buffer described later) 136 by the triangle drawing device 135 is accessed using the texture coordinate data (u, v). Namely, the triangle data (polygon rendering data) include physical coordinate values of vertexes of the triangle and colors and texture data of the vertexes.

Below, a detailed explanation will be given of the triangle drawing device 135.

Figure 15:
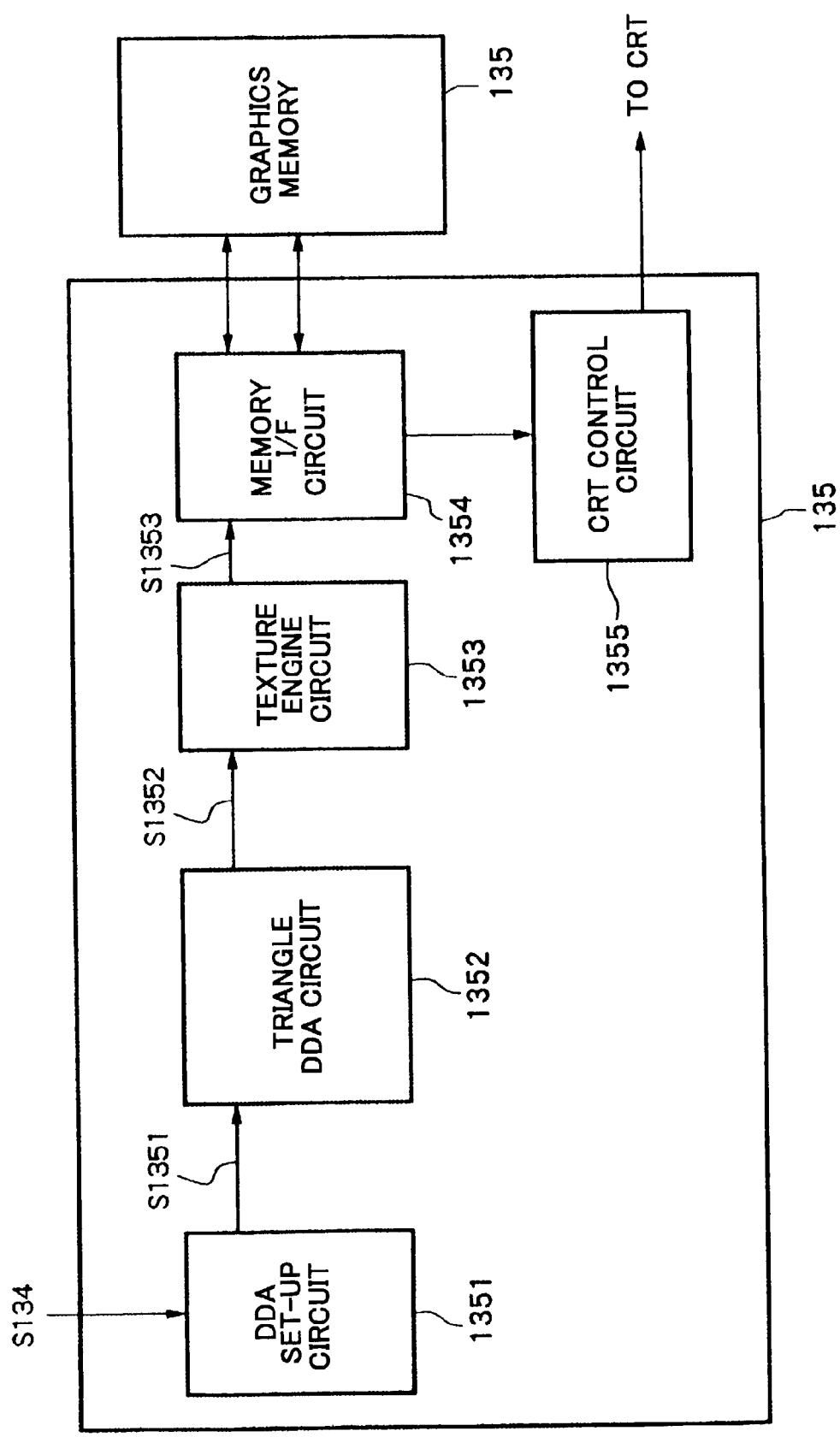
FIG. 15 is a block diagram of an example of the configuration of the triangle drawing device according to the present embodiment.

As shown in FIG. 15, the triangle drawing device 135 has a DDA set-up circuit 1351 as an initialization block for the linear interpolation, a triangle DDA circuit 1352 as a linear interpolation block, a texture engine circuit 1353, a memory interface (I/F) circuit 1354, and a CRT control circuit 1355.

Below, an explanation will be given of the configurations and functions of blocks of the triangle drawing device 135 in order in relation to the drawings.

Before linearly interpolating the values of vertexes of a triangle in the physical coordinate system in the later triangle DDA circuit 1352 to find the color and depth information of each pixel inside the triangle, the DDA set-up circuit 1351 performs a set-up operation to find the difference with sides of the triangle in the horizontal direction etc. for the (z, R, G, B, s, t, q) data indicated by the triangle data (polygon rendering data) S133a. This set-up operation specifically uses the value of the start point and the value of the end point and the distance between the start point and the end point to calculate the change of the values sought in a case of movement by a unit length. The DDA set-up circuit 1351 outputs set-up data S1351 and page data S133b as information concerning the primitive including the calculated change data to the triangle DDA circuit 1352.

Figure 16:
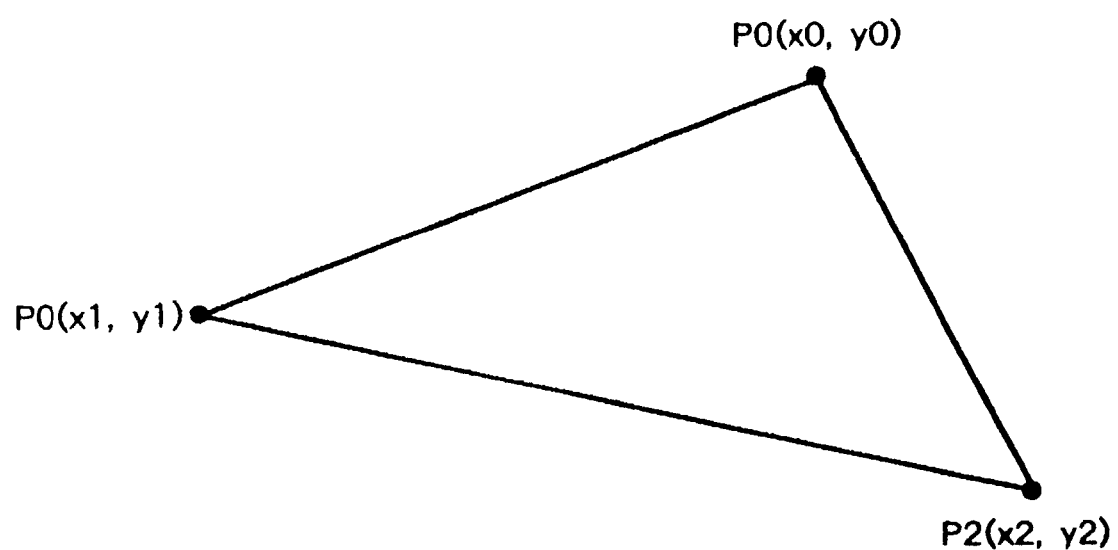
FIG. 16 is a view for explaining a function of a DDA set-up circuit according to the present embodiment.

The function of the DDA set-up circuit 1351 will be further explained in relation to FIG. 16. As explained above, the main processing of the DDA set-up circuit 1351 finds the change inside a triangle comprised by three vertexes P0 (x0, y0), P1 (x1, y1), and P2 (x2, y2) given various information (colors and texture coordinates) at each vertex passed through the prior geometry processing and reduced to physical coordinates so as to calculate the basic data of the later linear interpolation. The drawing of a triangle is reduced to drawing of individual pixels, but it is necessary to find the first value at the start point of the drawing for this purpose. Information at the first drawing point becomes the sum of the value obtained by multiplying a change in the horizontal direction with the horizontal distance from the vertex to the first drawing point and the value obtained by multiplying a change in the vertical direction with the vertical distance. Once the value on one integer lattice inside a target triangle is found, it becomes possible to find values at the other lattice points inside the target triangle by a whole multiple of the change.

In each vertex data of a triangle is, for example, the x,y coordinates consist of 16 bits, the z-coordinate consists of 24 bits, each of the RGB color values consist of 12 bits (=8+4), each of the s, t, q texture coordinates consist of a 32 bit floating decimal value (IEEE format), etc.

Figure 17:
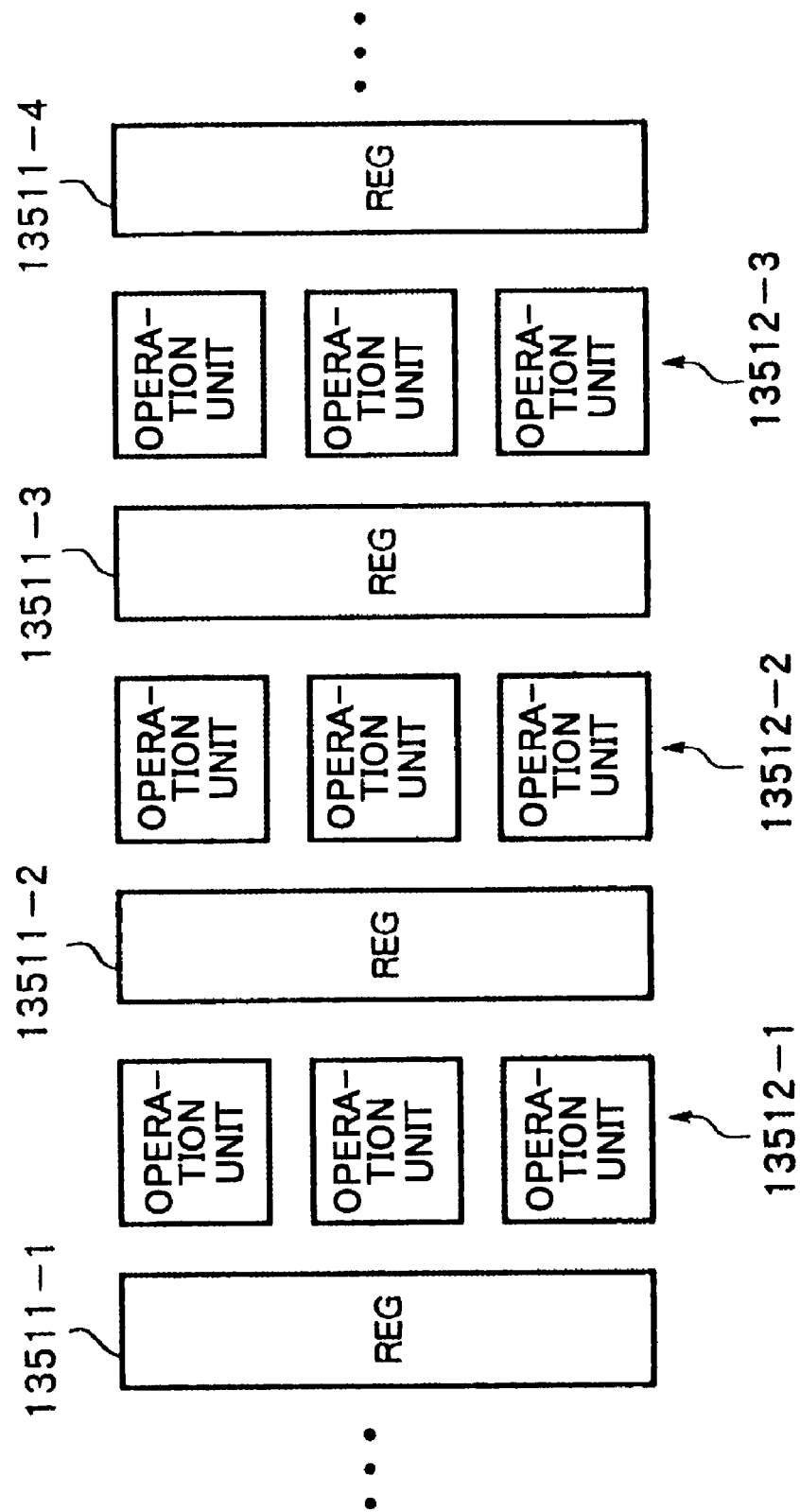
FIG. 17 is a view of an example of the configuration of the DDA set-up circuit according to the present embodiment.

Note that this DDA set-up circuit 1351 is mounted by not the DSP structure as in the conventional case, but by the ASIC technique. Specifically, as shown in FIG. 17, it is configured by a full data path logic obtained by inserting processing unit groups 13512-1 to 13512-3 having a plurality of operation units arranged in parallel among registers 13511-1 to 13511-4 arranged in multiple stages, in other words, as a time parallel structure of a synchronized pipeline system.

The triangle DDA circuit 1352 calculates the linearly interpolated (z, R, G, B, s, t, q) data at each pixel inside a triangle based on the set-up data S1351 as the information concerning the primitive including the change data input from the DDA set-up circuit 1351. The triangle DDA circuit 1352 outputs the (x, y) data of each pixel and the (z, R, G, B, s, t, q) data at the (x, y) coordinates as the DDA data (interpolated data) S1352 to the texture engine circuit 1353.

Namely, the triangle DDA circuit 1352 performs rasterization for interpolating image parameters of all pixels included inside a polygon based on the image parameters found for every vertex of the polygon. Specifically, the triangle DDA circuit 1352 rasterizes various data (z, texture coordinates, colors, etc.)

The texture engine circuit 1353 calculates "s/q" and "t/q", calculates the texture coordinate data (u, v), reads out the (R, G, B) data from the graphics memory 136, etc. by a pipeline system. Note that the texture engine circuit 1353 simultaneously performs processing on a plurality of (for example 4 or 8) pixels located in for example a predetermined rectangle in parallel.

The texture engine circuit 1353 performs operation for dividing the "s" data by the "q" data and operation for dividing the "t" data by the "q" data for the (s, t, q) data indicated by the DDA data S1352. The texture engine circuit 1353 is provided with for example exactly the same number of not illustrated division circuits as the number of pixels to be processed in parallel (for example 8) and simultaneously performs the divisions "s/q" and "t/q" for 8 pixels. Further, it is also possible to mount them for interpolation from a representative point among the 8 pixels.

Further, the texture engine circuit 1353 multiplies the division results, that is, "s/q" and "t/q", by the texture sizes USIZE and VSIZE to generate the texture coordinate data (u, v). Further, the texture engine circuit 1353 outputs a read request including the generated texture coordinate data (u, v) to the graphics memory 136 via the memory I/F circuit 1354 and reads out the texture data stored in the texture buffer included in the graphics memory 136 via the memory I/F circuit 1354 to thereby obtain the (R, G, B) data stored at the texture address corresponding to the (s, t) data. The texture engine circuit 1353 generates the pixel data by for example multiplying the (R, G, B) data of the read (R, G, B) data and the (R, G, B) data included in the DDA data S1352 from the prior triangle DDA circuit 1352 by each other. The texture engine circuit 1353 finally outputs this pixel data as the color value of the pixel to the memory I/F circuit 1354.

Note that the texture buffer included in the graphics memory 136 stores MIPMAP (plural resolution textures) and other texture data corresponding to a plurality of reduction rates. Here, which reduction rate of texture data to use is determined in units of triangles by using a predetermined algorithm.

The texture engine circuit 1353 directly uses the (R, G, B) data read from the texture buffer in the case of the full color mode. On the other hand, the texture engine circuit 1353 transfers the data of the color index table prepared in advance to a temporary storage buffer comprised of a built-in SRAM or the like from a texture color look up table (CLUT) buffer in the case of the index color mode and uses this CLUT to obtain the (R, G, B) data corresponding to the color index read from the texture buffer. For example, when the CLUT is comprised by an SRAM, when a color index is input to an address of the SRAM, the actual (R, G, B) data appears at the output thereof.

Figure 18:
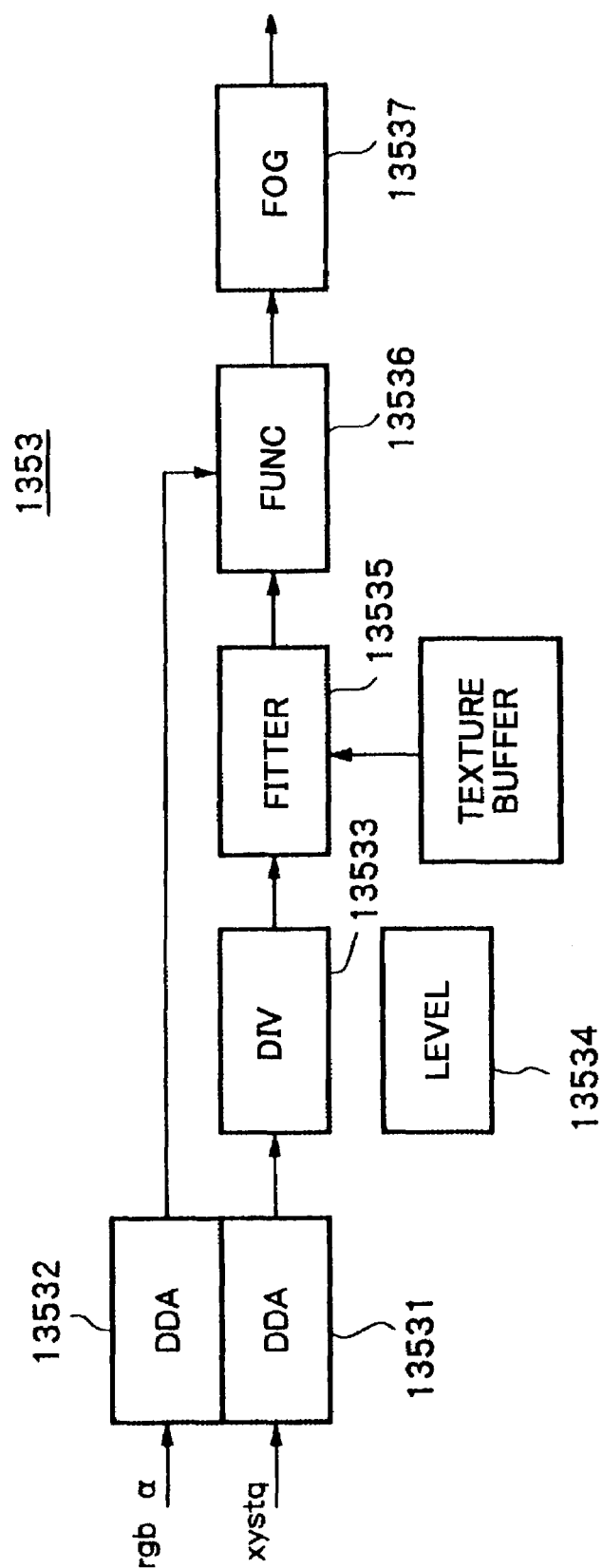
FIG. 18 is a block diagram of an example of the configuration of a texture mapping circuit in a texture engine circuit according to the present embodiment.
Figures 19A, 19B:
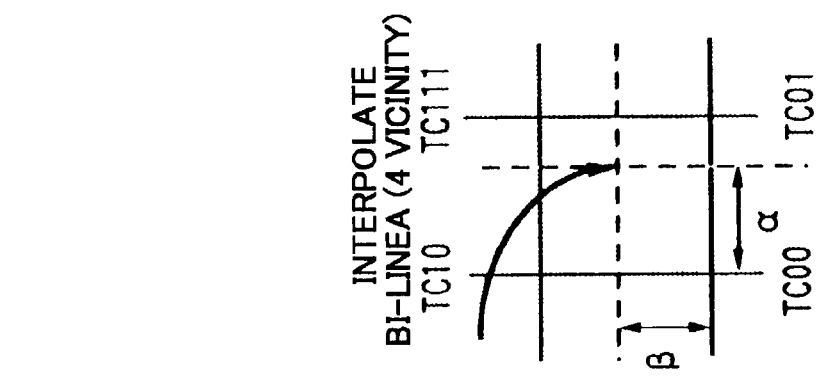
FIGS. 19A to 19C are views of an image of actual texture mapping in the texture engine circuit according to the present embodiment.
Figure 19C:
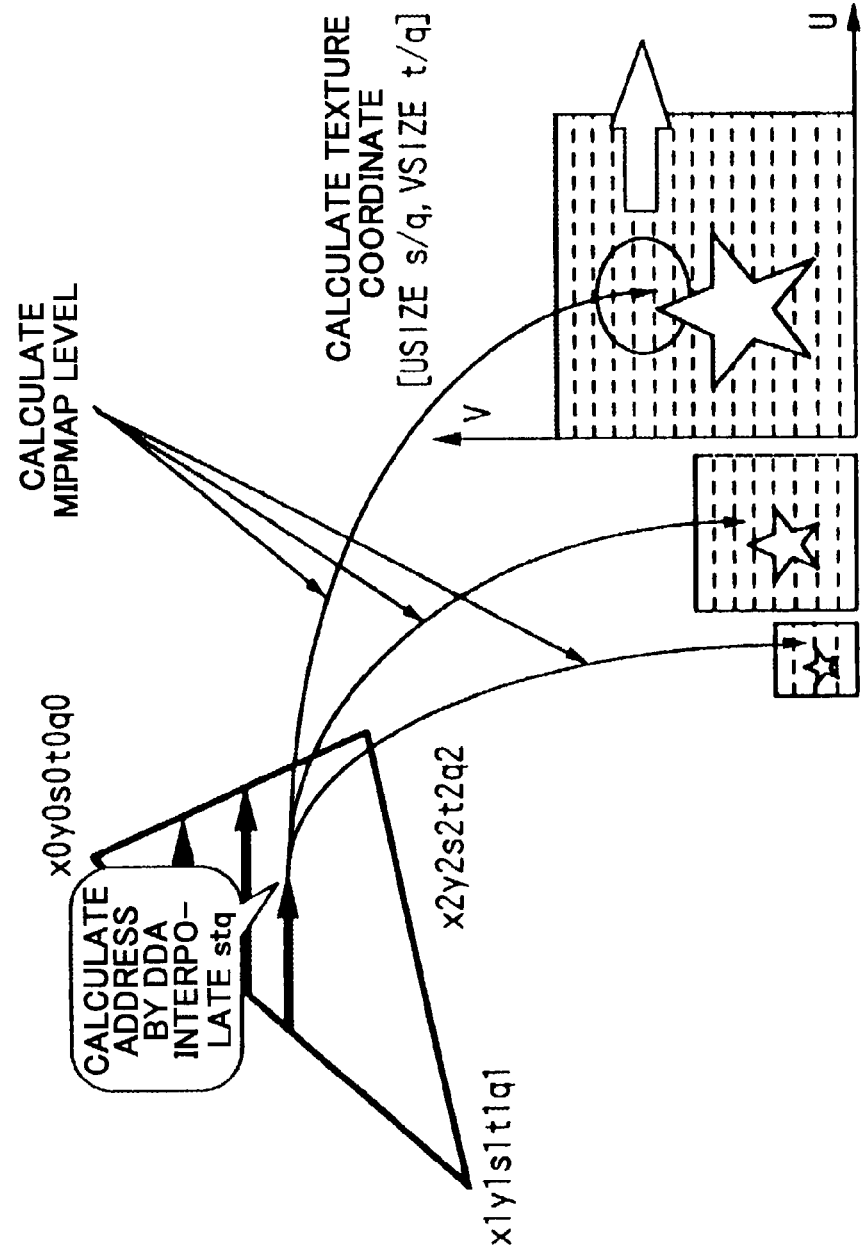

Here, so-called texture mapping will be further explained in relation to FIG. 18 and FIG. 19. FIG. 18 is a block diagram of an example of the configuration of a texture mapping circuit in the texture engine circuit 1353, and FIG. 19 is a view of the image of actual texture mapping.

This texture mapping circuit has DDA circuits 13531 and 13532, a texture coordinate calculation circuit (Div) 13533, a MIPMAP level calculation circuit 13534, a filter circuit 13535, a first combining circuit (FUNC) 13536 and a second combining circuit (FOG) 13537.

In this texture mapping circuit, as shown in FIG. 19A, the DDA circuits 13531 and 13532 use the homogeneous coordinates s, t, q of texture linearly interpolated inside a triangle and convert them to actual addresses of the texture in Descartes coordinates (division by q). Further, when performing MIPMAP etc., the MIPMAP level calculation circuit 13534 calculates the MIPMAP level. Then, as shown in FIG. 19B, the texture coordinate calculation circuit 13533 calculates the texture coordinates. Further, the filter circuit 13535 reads the texture data of each level from a texture buffer included in the graphics memory 136 and performs point sampling using the same as is or bi-linea (4 vicinity) interpolation, Tri-linea interpolation, etc. The texture color obtained there is processed as follows. Namely, the first combining circuit 13536 combines the input object color and texture color, and the second combining circuit 13537 combines a fog color with this to determine the color of the pixel to be finally drawn.

The memory I/F circuit 1354 compares the z-data corresponding to the pixel data S135 input from the texture engine circuit 1353 and the z-data stored in the z-buffer included in the graphics memory 136, decides whether or not the image drawn by the input pixel data is located closer (to the viewing point) than the image written in the graphics memory 136 (display buffer) the previous time, and, when it is located closer, updates the z-data stored in the z-buffer by the z-data corresponding to the image data. Further, the memory I/F circuit 1354 writes the (R, G, B) data in the graphics memory 136 (display buffer).

Further, the memory I/F circuit 1354 calculates the memory block of the graphics memory 136 storing the texture data corresponding to the texture address at the pixel to be drawn from then from that texture address and issues a read request to only that memory block to thereby read out the texture data. In this case, memory blocks not holding the corresponding texture data are not accessed for reading the texture data, so it becomes possible to provide a longer access time for the graphics drawing.

In graphics drawing as well, the memory I/F circuit 1354 reads out pixel data from the pixel address to be drawn from then for modify writing from the memory block of the graphics memory 136 storing the pixel data corresponding to that pixel address and writes back the same to the same address after modification. When performing hidden plane processing, it reads out the depth data from the pixel address to be drawn from then from the memory block storing the depth data corresponding to that pixel address and, if necessary, performs modify writing and writes back the result to the same address after the modification.

Further, when receiving a read request including the generated texture coordinate data (u, v) with respect to the graphics memory 136 from the texture engine circuit 1353, the memory I/F circuit 1354 reads out the (R, G, B) data stored in the graphics memory 136. Further, when receiving a request for reading the display data from the CRT control circuit 1355, the memory I/F circuit 1354 reads out constant amounts of the display data, for example, in units of 8 pixels or 16 pixels, from the graphics memory 136 (display buffer) in response to this request.

The memory I/F circuit 1354 accesses (writes in or reads from) the graphics memory 136, but the write path and read path are configured as different paths. Namely, when writing, a write address ADRW and write data DTW are processed in a write system circuit and written into the graphics memory 136, and when reading, they are processed at a read system circuit and read from the graphics memory 136. The memory I/F circuit 1354 accesses the graphics memory 136 in units of for example 16 pixels based on addressing of a predetermined interleave system.

In such a transfer of data with the memory, it is possible to perform the plurality of processing up to then in parallel so as to improve the drawing performance. Particularly, by providing the same circuits for the triangle DDA portion and the texture engine portion in a parallel execution format (space parallel) or by finely inserting a pipeline (time parallel), simultaneous calculations of a plurality of pixels are carried out. In the memory blocks of the graphics memory 136, adjacent portions in the display region are arranged so as to become different memory blocks as will be explained later, therefore when drawing a plane such as triangle, simultaneous processing can be carried out on the plane and therefore the probability of operation of each memory block becomes very high.

The graphics memory 136 acts as a texture buffer, display buffer, z-buffer, and texture CLUT buffer. Further, the graphics memory 136 is divided to a plurality of, for example, four modules having the same functions.

Further, the graphics memory 136 stores indexes in the index colors and the CLUT values for the same in the texture CLUT buffer in order to store more texture data. The indexes and CLUT values are used for the texture processing as mentioned above. Namely, usually, a texture element is expressed by a total of 24 of R, G, B each consisting of 8 bits, but the amount of data swells due to this, therefore one color is selected from among for example 256 colors selected in advance and the data of the same is used for the texture processing. Due to this, if there are 256 colors, each texture element can be expressed by 8 bits. A conversion table from the indexes to the actual colors becomes necessary, but the higher the resolution of the texture, the more compact the texture data becomes possible. Due to this, compression of the texture data becomes possible, and efficient utilization of the built-in memory becomes possible.

Further, the graphics memory 136 stores depth information of the object to be drawn for hidden plane processing simultaneously and parallel with the graphics drawing. Note that, as the method of storage of the display data and depth data and texture data, for example, the display data is continuously stored at a predetermined position of a memory block, for example, from the head, the depth data is stored next, and the texture data is stored in the continuing address space for every type of the texture in the remaining empty region. When conceptually explaining this in relation to the drawings, as shown in FIGS. 18A to 18C, the display data and the depth data are stored with for example 24 bits width in a region indicated by FB in the figures from a position indicated by a so-called base pointer (BP), and the texture data is stored in the region of 8 bits width as the remaining empty region as indicated by TB in the figure. This means formation of a unified memory of the display data and texture data. Due to this, the texture data can be more efficiently stored.

As described above, after the processing in the DDA set-up circuit 1351, the triangle DDA circuit 1352, the texture engine circuit 1353, the memory I/F circuit 1354, etc., the final memory access becomes the pixel, that is, the drawn picture cell element.

The CRT control circuit 1355 generates a display address for displaying the data on a monitor 14 such as a CRT in synchronization with given horizontal and vertical synchronization signals and outputs a request for reading the display data from the display buffer included in the graphics memory 136 to the memory I/F circuit 1354. In response to this request, the memory I/F circuit 1354 reads out constant amounts of the display data from the graphics memory 136 (display buffer). The CRT controller circuit 1355 includes for example a FIFO circuit for storing the display data read from the graphics memory 136 and generates RGB index values at predetermined time intervals. The CRT controller circuit 1355 stores the R, G, B data corresponding to the index values, transfers digital format R, G, B data corresponding to the RGB index values generated to a not illustrated digital/analog converter (D/A converter), and generates analog format R, G, B data. The CRT controller circuit 1355 outputs these generated R, G, B data to a not illustrated CRT.

Next, an explanation will be given of the operation by the above configuration.

In the three-dimensional computer graphics system 10, the main processor 11 reads for example the required graphics data from the main memory 12 in accordance with the state of progress of the application. The main processor 11 performs predetermined processing on this graphics data, generates for example the curved surface data S11a, and outputs it to the graphics processor 13. Alternatively, the main processor 11 performs predetermined processing on the graphics data read from the main memory 12, generates the vertex data S11b, and outputs it to the graphics processor 13.

The graphics processor 13 inputs the curved surface data S11a from the main processor 11 to the vertex generator 131 and inputs the vertex data 11b to the geometry processor 132. The vertex generator 131 receives the curved surface data S11a supplied from the main processor 11, generates the vertex data S131 from the control point of the curved surface data S11a, and outputs it to the geometry device 132.

The geometry processor 132 processes the vertex data from the vertex generator 131 or the vertex data S11b from the main processor 11 by the coordinate conversion, clipping, lighting, and other geometry processings. Then, the geometry processor 132 generates the triangle data S132 and outputs it to the triangle generator 133.

The triangle generator 133 receives the vertex data S132 from the geometry processor 132 or the vertex data S11b from the main processor 11 and selects a plurality of vertexes other than the predetermined end points from among the 3×3 vertexes forming the mesh. The triangle generator 133 judged whether each selected vertex is valid or invalid based on the distance between the selected vertex and an adjacent vertex. Specifically, it judges it to be valid if for example the sum of distances between the selected vertex and a plurality of adjacent vertexes is at least a constant value and judges it to be invalid if less than the constant value. The triangle generator 133 generates adjacent relationship data between vertexes based on the validity/invalidity information of each vertex as the judgment result, for example, information of how many vertexes are valid among the judgment results with respect to the selected plurality of vertexes. Then, the triangle generator 133 generates the triangle data in accordance with the generated adjacent relationship data and outputs it via the triangle buffer 134 to the triangle drawing device 135.

The triangle drawing device 135 generates change data indicating the difference with a side of the triangle in the horizontal direction etc. based on the polygon rendering data S11 at the DDA set-up circuit 1351. Specifically, it uses the value of the start point and the value of the end point and the distance between the start point and the end point to calculate the change of the values sought in a case of movement by a unit length and outputs the results as the set-up data S1351 including the change data to the triangle DDA circuit 1352.

The triangle DDA circuit 1352 uses the set-up data S1351 including the change data to calculate the linearly interpolated (z, R, G, B, s, t, q) data at each pixel inside a triangle. Then, the triangle DDA circuit 1352 outputs these calculated (z, R, G, B, s, t, q) data and (x, y) data of each vertex of the triangle as DDA data S1352 to the texture engine circuit 1353. Namely, the triangle DDA circuit 1352 performs rasterization for interpolating the image parameters (z, texture coordinates, colors, etc.) of all pixels included inside a polygon based on the image parameter found for every vertex of the polygon. Then, the triangle DDA circuit 1352 rasterizes the various types of data (z, texture coordinates, colors, etc.) and outputs the results as the DDA data S1352 to the texture engine circuit 1353.

The texture engine circuit 1353 processes the (s, t, q) data indicated by the DDA data S1352 to divide the "s" data by the "q" data and divide the "t" data by the "q" data. Further, it multiplies the division results "s/q" and "t/q" by the texture sizes USIZE and VSIZE to generate the texture coordinate data (u v).

Next, the texture engine circuit 1353 outputs a read request including the generated texture coordinate data (u, v) to the memory I/F circuit 1354 and reads out the (R, G, B) data stored in the graphics memory 136 via the memory I/F circuit 1354. Next, the texture engine circuit 1353 multiplies the (R, G, B) data of the read (R, G, B) data and the (R, G, B) data included in the DDA data S1352 from the prior triangle DDA circuit 1352 to generated the pixel data. This pixel data is output from the texture engine circuit 1353 to the memory I/F circuit 1354.

Then, the memory I/F circuit 1354 compares the z-data corresponding to the pixel data input from the texture engine circuit 1353 and the z-data stored in the z-buffer and decides whether or not the image drawn by the input pixel data S135 is located closer (to the viewing point) than the image written in the display buffer the previous time. When the result of the decision is that it is located closer, it updates the z-data stored in the z-buffer by the z-data corresponding to the image data.

Next, the memory I/F circuit 1354 writes the (R, G, B) data into the display buffer of the graphics memory 136. The data to be written (including also updating) is written into a predetermined memory in parallel via the write system circuit.

The memory I/F circuit 1354 calculates the memory block of the graphics memory 136 storing the texture corresponding to the texture address at the pixel to be drawn from then by that texture address, issus a read request to only that memory block, and reads out the texture data. In this case, memory blocks not holding the corresponding texture data are not accesses for reading the texture, so it becomes possible to provide more access time for the graphics generation.

In graphics drawing as well, the circuit reads out the pixel data from the pixel address to be drawn from then from the memory block storing the pixel data corresponding to that pixel address for modify writing, modifies it, then writes it back to the same address.

When performing hidden plane processing, the circuit reads out depth data from the pixel address to be drawn from then from the memory block storing the depth data corresponding to that pixel address for modify writing and, if necessary, modifies it, then writes it back at the same address.

Further, when displaying an image on a not illustrated CRT, the CRT control circuit 1355 generates a display address in synchronization with the given horizontal and vertical synchronization frequencies and issues a request for transfer of the display data to the memory I/F circuit 1354. The memory I/F circuit 1354 transfers the display data in constant amounts to the CRT control circuit 1355 in accordance with that request. The CRT control circuit 1355 stores the display data in a not illustrated display use FIFO or the like and generates RGB index values at predetermined intervals. The CRT control circuit 1355 stores the RGB values with respect to the RGB indexes and transfers the RGB values for the index values to a not illustrated D/A converter. The RGB signals converted to the analog signals at the D/A converter are transferred to the CRT.

As explained above, according to the present embodiment, provision is made of a triangle generator 133 for receiving the vertex data S132 from the geometry processor 132, selecting a plurality of vertexes other than the predetermined end points from among 3×3 vertexes forming a mesh, judging whether each selected vertex is valid or invalid based on the distance between the selected vertex and the adjacent vertex, generating triangle data S134 based on the validity/invalidity information of each vertex, and outputting the same via the triangle buffer 134 to the triangle drawing device 135. Therefore, 0 pixel triangles (triangles not including the center of the pixel) can be decreased, so the number of minute unit graphics can be reduced and the performance of graphics drawing processing of the triangle drawing device 135 can be improved.

Second Embodiment

Figure 21:
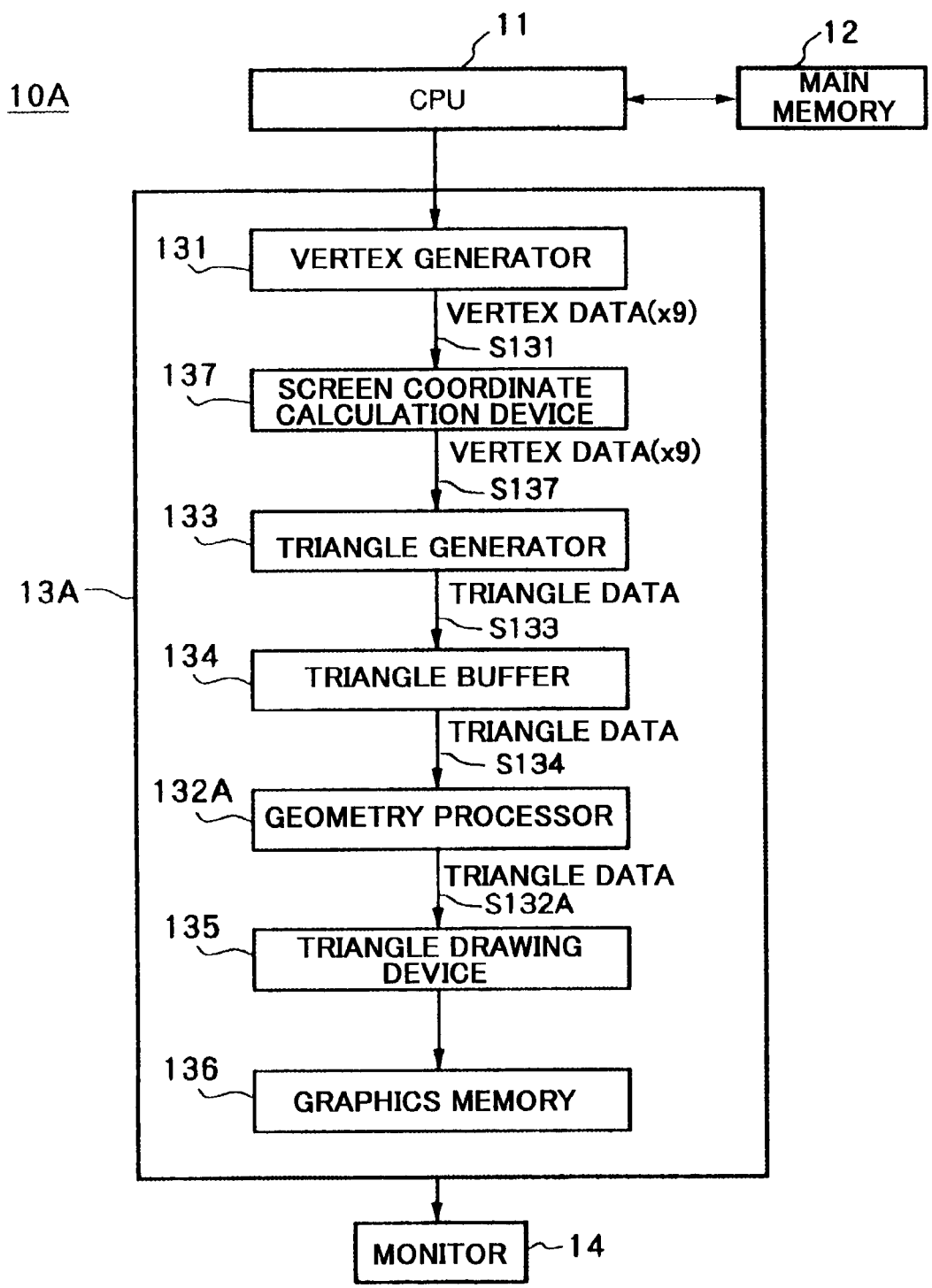
FIG. 21 is a view of the system configuration of a second embodiment of a three-dimensional computer graphics system as an image processing apparatus according to the present invention.

FIG. 21 is a view of the system configuration of a second embodiment of a three-dimensional computer graphics system 10 as an image processing apparatus according to the present invention.

The difference of the second embodiment from the first embodiment resides in the processing of the graphics processor 13A.

Namely, the first embodiment processed the vertex data in the geometry processor 132 by coordinate conversion, clipping, lighting, and other geometry processing processing, generated vertex data S132 of nine points converted from the world coordinate system to the screen coordinate system, and judged the validity/invalidity of each vertex at the triangle generator 133.

As opposed to this, the second embodiment arranges a screen coordinate calculation device 137 after the vertex generator 131, calculates only the xy coordinates in the screen coordinate system required for the judgment of validity/invalidity of the vertexes, inputs the vertex data S137 after this calculation to the triangle generator 133, and judges the validity/invalidity of each vertex to generate the triangle data. Further, the second embodiment arranges a geometry device 132A between the triangle buffer 134 and the triangle drawing device 135, judges the validity/invalidity of each vertex to decrease the vertex data, and then performs geometry processing such as clipping and lighting.

According to the second embodiment, in addition to the effects of the first embodiment, there are the advantages such that amount of processing can be reduced and the processing can be speeded up.

Summarizing the effects of the invention, as explained above, according to the present invention, the number of minute unit graphics can be decreased, and the performance of graphics drawing processing of the drawing device can be improved. As a result, an image can be efficiently generated.

Further, according to the present invention, there are the advantages that the amount of operation can be reduced and the processing can be speeded up.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus for expressing a primitive as a combination of a plurality of unit graphics formed by connecting a plurality of vertexes, generating pixels in a graphics drawing target region of a screen coordinate system, and drawing the unit graphics in a memory, comprising:
    a unit graphic generator for selecting a plurality of vertexes other than predetermined end points from among a plurality of vertex data able to form a predetermined shape, judging whether each selected vertex is valid or invalid based on a distance between the selected vertex and an adjacent vertex, and generating unit graphic data based on validity/invalidity information of each vertex; and
    a drawing device for receiving the unit graphic data generated at the unit graphic generator and drawing at least one unit graphic, wherein the unit graphic generator judges a vertex as valid when a sum of distances between each selected vertex and a plurality of adjacent vertexes is at least a constant value set in advance and judges it as invalid when the sum is less than the constant value.

2. An image processing apparatus as set forth in claim 1, wherein the plurality of vertex data is supplied to the unit graphic generator after geometry processing.

3. An image processing apparatus as set forth in claim 1, wherein:
    the plurality of vertex data supplied to the unit graphic generator is data including only two-dimensional coordinates in the screen coordinate system, and
    the apparatus further comprises a geometry processor for performing geometry processing with respect to the unit graphic data generated by the unit graphic generator and supplying the unit graphic data to the drawing device after performing the geometry processing.

4. An image processing apparatus for expressing a primitive as a combination of a plurality of unit graphics formed by connecting a plurality of vertexes, generating pixels in a graphics drawing target region of a screen coordinate system, and drawing the unit graphics in a memory, comprising:
    a unit graphic generator for selecting a plurality of vertexes other than predetermined end points from among a plurality of vertex data able to form a predetermined shape, judging whether each selected vertex is valid or invalid based on a distance between the selected vertex and an adjacent vertex, and generating unit graphic data based on validity/invalidity information of each vertex; and
    a drawing device for receiving the unit graphic data generated at the unit graphic generator and drawing at least one unit graphic, wherein:
        the plurality of vertex data supplied to the unit graphic generator forms a predetermined matrix, and
        the unit graphic generator includes:
            a center point validity judgment circuit for selectively receiving as input data relating to a vertex located at the center of the matrix among a supplied plurality of vertex data other than the end points and data relating to a plurality of adjacent vertexes adjacent to that center vertex, judging whether or not a sum of distances between the center vertex and the plurality of adjacent vertexes is at least a constant value set in advance, outputting data meaning that the center vertex is valid when judging that the sum is at least the constant value and outputting data meaning that the center vertex is invalid when judging that the sum is less than the constant value;

a plurality of side middle point validity judgment circuits for receiving as input data relating to a vertex forming the center of a side among a plurality of vertexes arranged in a same row or column not including the center vertex of the matrix and composing a predetermined side and a plurality of vertexes adjacent to that side middle vertex, judging whether or not the sum of distances between the side middle vertex and the plurality of adjacent vertexes is at least a constant value set in advance, outputting data meaning that the side middle vertex is valid when judging that the sum is at least the constant value, and outputting data meaning the data is invalid when judging that the sum is less than the constant value; and an inter-vertex adjacent relationship data generation circuit for generating adjacent relationship data among vertexes in accordance with the number of data indicating validity among the plurality of validity/invalidity data based on the validity/invalidity data by the center point validity judgment circuit, the validity/invalidity data by the side middle point validity judgment circuit, and the supplied plurality of vertex data and generating unit graphic data in accordance with the generated adjacent relationship data.

5. An image processing apparatus as set forth in claim 4, wherein the plurality of vertex data is supplied to the unit graphic generator after geometry processing.

6. An image processing apparatus as set forth in claim 4, wherein:

the plurality of vertex data supplied to the unit graphic generator is data including only two-dimensional coordinates in the screen coordinate system, and the apparatus further comprises a geometry processor for performing geometry processing with respect to the unit graphic data generated by the unit graphic generator and supplying the unit graphic data to the drawing device after performing the geometry processing.

7. An image processing method for expressing a primitive as a combination of a plurality of unit graphics formed by connecting a plurality of vertexes, generating pixels inside a graphics drawing target region of a screen coordinate system, and drawing the unit graphics in a memory, comprising:

selecting a plurality of vertexes other than predetermined end points from among a plurality of vertex data able to form a predetermined shape and generating validity/invalidity information by judging whether each selected vertex is valid or invalid based on a distance between the selected vertex and an adjacent vertex;

generating unit graphic data based on the validity/invalidity information of each vertex; and receiving the unit graphic data generated based on validity/invalidity information of each vertex and drawing at least one unit graphic, wherein, selecting a plurality of vertexes further comprises judging a vertex as valid when a sum of distances between each selected vertex and a plurality of adjacent vertexes is at least a constant value set in advance and judged as invalid when the distance is less than the constant value.

8. An image processing method for expressing a primitive as a combination of a plurality of unit graphics formed by connecting a plurality of vertexes, generating pixels inside a graphics drawing target region of a screen coordinate system, and drawing the unit graphics in a memory, comprising:

selecting a plurality of vertexes other than predetermined end points from among a plurality of vertex data able to form a predetermined shape and generating validity/invalidity information by judging whether each selected vertex is valid or invalid based on a distance between the selected vertex and an adjacent vertex;

generating unit graphic data based on the validity/invalidity information of each vertex;

receiving the unit graphic data generated based on validity/invalidity information of each vertex and drawing at least one unit graphic; and forming a predetermined matrix from the plurality of vertex data;

wherein generating the validity/invalidity information further includes:

selectively receiving as input data relating to a vertex located at the center of the matrix among the supplied plurality of vertex data other than the end points and a plurality of adjacent vertexes adjacent to that center vertex and judging whether or not a sum of distances between the center and the plurality of adjacent vertexes is at least a constant value set in advance, outputting data meaning that the center vertex is valid when judging that the sum is at least the constant value and outputting data meaning that the center vertex is invalid when judging that the sum is less than the constant value, selectively receiving as input data relating to a vertex forming the center of a side among a plurality of vertexes arranged in the same row or column not including the center vertex of the matrix and composing a predetermined side and a plurality of vertexes adjacent to that side middle vertex and judging whether or not the sum of distances between the side middle vertex and the plurality of adjacent vertexes is at least a constant value set in advance, and outputting data meaning that the center vertex is valid when judging that the sum is at least a constant value and outputting data meaning it is invalid when judging that the sum is less than the constant value for every side; and wherein generating unit graphic data further includes:

generating adjacent relationship data among vertexes in accordance with the number of data indicating validity from the generated validity/invalidity information, and generating unit graphic data in accordance with the generated adjacent relationship data.

* * * * *